(12) United States Patent
Lundblade et al.

(10) Patent No.: US 7,784,089 B2
(45) Date of Patent: Aug. 24, 2010

(54) SYSTEM AND METHOD FOR PROVIDING A MULTI-CREDENTIAL AUTHENTICATION PROTOCOL

(75) Inventors: Laurence Lundblade, San Diego, CA (US); Ivan Hugh McLean, Solana Beach, CA (US); Gerald Charles Horel, Brentwood Bay (CA)

(73) Assignee: Qualcomm Incorporated, San Diego, CA (US)

( * ) Notice: Subject to any disclaimer, the term of this patent is extended or adjusted under 35 U.S.C. 154(b) by 623 days.

(21) Appl. No.: 10/976,391

(22) Filed: Oct. 29, 2004

(65) Prior Publication Data

US 2006/0095957 A1 May 4, 2006

(51) Int. Cl.
*H04L 9/00* (2006.01)
*H04L 29/06* (2006.01)
*H04L 9/32* (2006.01)
*G06F 7/04* (2006.01)
*G06F 13/00* (2006.01)
*G09C 1/00* (2006.01)

(52) U.S. Cl. .......... 726/5; 726/3; 726/10; 380/277; 713/156; 713/168; 713/186

(58) Field of Classification Search .......... 726/5, 726/3, 10; 382/115; 713/186, 156, 168; 380/277
See application file for complete search history.

(56) References Cited

U.S. PATENT DOCUMENTS

| | | | |
|---|---|---|---|
| 6,256,733 B1 * | 7/2001 | Thakkar et al. | 713/156 |
| 7,185,199 B2 * | 2/2007 | Balfanz et al. | 713/168 |
| 7,373,502 B2 * | 5/2008 | McGrew | 713/155 |
| 2003/0188193 A1 * | 10/2003 | Venkataramappa | 713/201 |
| 2004/0049697 A1 * | 3/2004 | Edwards et al. | 713/201 |

FOREIGN PATENT DOCUMENTS

EP 1168750 A1 * 1/2002

OTHER PUBLICATIONS

Bogdan C. Popescu, Bruno Crispo, Andrew S. Tanenbaum, Frank L.A.J. Kamperman, "A DRM security architecture for home networks", Oct. 2004, DRM '04: Proceedings of the 4th ACM workshop on Digital rights management, Publisher: ACM, pp. 1-10.*

* cited by examiner

*Primary Examiner*—Matthew B Smithers
*Assistant Examiner*—Courtney D Fields
(74) *Attorney, Agent, or Firm*—Brent A Boyd; Fariba Yadegar-Bandari

(57) ABSTRACT

A system and method for providing secure communications between remote computing devices and servers. A network device sends characteristics of a client computing device over the network. A network device receives characteristics of a client computing device over the network. A plurality of credentials are generated where at least one of the plurality of credentials based on both the received characteristics of the client computing device and a unique client key, and at least one of the plurality of credentials based on both the received characteristics of the client computing device and a generic key. A network device sends the plurality of credentials over the network. A network device receives the plurality of credentials via the network.

88 Claims, 9 Drawing Sheets

SYSTEM AND METHOD FOR PROVIDING A MULTI-CREDENTIAL AUTHENTICATION PROTOCOL

BACKGROUND

I. Field

The present invention generally relates to secure communications between remote computing devices and servers. More particularly, the invention relates to the creation, maintenance, revocation and renewal of secure client credentials used in providing strong authentication between remote computing devices and servers.

II. Background

Advances in technology have resulted in smaller and more powerful personal computing devices. For example, there currently exist a variety of portable personal computing devices, including wireless computing devices, such as portable wireless telephones, personal digital assistants (PDAs), and paging devices that are each small, lightweight, and can be easily carried by users. More specifically, the portable wireless telephones, for example, further include cellular telephones that communicate voice and data packets over wireless networks. Further, many such cellular telephones are being manufactured with relatively large increases in computing capabilities, and as such, are becoming tantamount to small personal computers and hand-held PDAs. Typically, these smaller and more powerful personal computing devices are severely resource constrained. For example, the screen size, amount of available memory and file system space, amount of input and output capabilities and processing capability may be each limited by the small size of the device. Because of such severe resource constraints, it is often typically desirable, for example, to maintain a limited size and quantity of software applications and other information residing on such personal computing devices (client computing devices).

Some of these personal computing devices utilize application programming interfaces ("APIs"), sometimes referred to as runtime environments and software platforms, that are installed onto their local computer platform and which are used, for example, to simplify operation of such devices, such as by providing generalized calls for device specific resources. Further, some such APIs are also known to provide software developers the ability to create software applications that are fully executable on such devices. In addition, often such APIs are known to be operationally located between the computing device system software and the software applications such that the computing device computing functionality is made available to the software applications without requiring the software developer to have the specific computing device system source code. Further, some like APIs are known to provide mechanisms for secure communications between such personal devices (i.e., clients) and remote devices (i.e., servers) using secure cryptographic key information.

Examples of such an APIs, some of which are discussed in more detail below, include those currently publicly available versions of the Binary Runtime Environment for Wireless® (BREW®) developed by Qualcomm, Inc., of San Diego, Calif. BREW® is sometimes described as a thin veneer existing over a computing device's (typically a wireless cellular phone) operating system, which, among other features, provides interfaces to hardware features particularly found on personal computing devices. BREW® is further characterized by, at least, the one advantage of being able to be provided on such personal computing devices at a relatively low cost with respect to demands on such device resources and with respect to the price paid by consumers for devices containing the BREW® API. Other features known to be associated with BREW® include its end-to-end software distribution platform that provides a variety of benefits for wireless service operators, software developers and computing device consumers. At least one such currently available end-to-end software distribution platform includes logic distributed over a server-client architecture, where the server performs, for example, billing, security and application distribution functionality, and the client performs, for example, application execution, security and user interface functionality.

Regarding providing strong authentication between client computing devices and servers, currently, some systems provide such secure communications by incorporating corresponding cryptographic (encryption) algorithms or programs on the corresponding client computing devices and servers. This is done in order to allow servers to authenticate client devices. Here, such systems typically provide similar cryptographic algorithms on the server to decipher whether a credential received from the apparent corresponding client is from a trusted, authenticated source. Such systems are characterized by the generation of credential-type information based on information all of which is available on, for example, each client computing device. Such systems are known to contain certain vulnerabilities such as the possibility of the loss of secure communications because of unauthorized access to any one of the copies of the cryptographic algorithm as it exists on any one of the corresponding client computing devices. This vulnerability exists, for example, because generally such cryptographic algorithms generate credential information based on available information often maintained on the corresponding client computing devices and/or servers. Therefore, when both the cryptographic algorithm and the data used by such algorithms are freely available, any entity that is successful in deciphering how credentials are generated in any such device, is now also all but in possession of the information that would allow such entity to selectively breach the secure communications otherwise present in such systems and masquerade as an authenticated and valid client computing device.

Other systems that provide secure communications between client computing devices and servers are known to do so by, at least in part, having a secure credential installed on the client computing devices at the time of manufacture. In one example, a service provider provides secure credentials to computing device manufacturers such that the manufacturers can install the individual secure credentials on separate client computing devices during the manufacturing process. Although such systems do not generally suffer from some of the vulnerabilities of those systems described above, e.g., those that maintain cryptographic algorithms on each of the handsets, such credential installation systems do have their own unique problems and vulnerabilities. For example, such credential installation systems are often difficult to implement because of the general requirement of having to add a dynamic step to what otherwise is typically a series of static steps that make up the manufacturing process. More specifically, unlike the typical static step that represents an identical operation performed on each and every computing device, the new dynamic step, in contrast, represents a new step where a different operation is performed (the adding of a unique credential) on each separate client computing device. This is highly unlike the typical static step of, for example, installing an identical display in an identical manner on each and every separate client computing device. In addition, at least one vulnerability of such systems include the potential occurrence of unauthorized access to the list of secure credentials that might allow unauthorized entities to spoof the identity of an otherwise authorized device.

In other systems, secure communication is provided, in part, by the installation or programming of phones by an authorized agent. Typically such programming occurs after the client computing devices have been manufactured and shipped. In one example, a secure credential is installed on the client computing device at the time and place of sale of the device. Here, in at least one example, an authorized agent inputs a code, from a list of unique secure codes, into the client computing device. In other instances, automated readers are used to transfer individual secure codes to each client computing device. Although, this process avoids some of the difficulties associated with programming such client computing devices at the time of manufacture, such as adding a dynamic manufacturing step to a typically static step process, this process still contains its own difficulties and vulnerabilities. For example, one vulnerability is the problem of potential unauthorized access to the list of secure credentials that would allow unauthorized entities to spoof the identity of an otherwise authorized device.

Also generally typical of currently available secure communication systems is the hard-wired or hard-coded aspect of the use of credentials on corresponding client devices. This hard-wired/hard-coded aspect of such systems requires that client devices be physically serviced by a service technician whenever a situation, such as a security breach, has occurred where, for example, any one or more credentials, need to be replaced, added to, and/or otherwise updated. Such a requirement to be physically serviced by a service technician is extremely costly, particularly when large numbers of client devices are compromised.

Accordingly it would be advantageous to provide a client-server system that includes many of the secure communication advantages inherent in general secure communications techniques, such as those associated with the use of secure credentials, while also avoiding other less advantageous aspects of such existing systems, such as the problems associated with storing cryptographic algorithms on client computing devices, requiring the installation of secure credentials at the time of manufacture or the programming of secure credentials at point of sale locations and the ability to update or replace these credentials in the event of a security breach.

SUMMARY

Embodiments disclosed herein address the above stated needs including, for example, one or more embodiments, in which methods, software and apparatus, are used to provide secure communications between client computing devices and servers. At least one embodiment includes receiving, via the network, the characteristics of the client computing device. Such embodiment also includes generating a plurality of credentials, at least one of the plurality of credentials based on both the received characteristics of the client computing device and a unique client key, and at least one of the plurality of credentials based on both the received characteristics of the client computing device and a generic key. Such embodiment also includes sending, via the network, the plurality of credentials.

At least one embodiment includes sending, via the network, characteristics of the client computing device. Such embodiment also includes receiving, via the network, a plurality of credentials, at least one of the plurality of credentials based on both the characteristics of the client computing device and a unique client key, and at least one of the plurality of credentials based on both the characteristics of the client computing device and a generic key.

At least one embodiment includes sending from the client computing device, via the network, characteristics of the client computing device. Such embodiment also includes receiving at the server, via the network, the characteristics of the client computing device. Such embodiment also includes generating a plurality of credentials, at least one of the plurality of credentials based on both the received characteristics of the client computing device and a unique client key, and at least one of the plurality of credentials based on both the received characteristics of the client computing device and a generic key. Such embodiment also includes sending from the server, via the network, the plurality of credentials. Such embodiment also includes receiving at the client computing device, via the network, receiving, via the network, the plurality of credentials.

At least one embodiment includes logic configured to receive, via the network, characteristics of the client computing device. Such embodiment also includes logic configured to generate a plurality of credentials, at least one of the plurality of credentials based on both the received characteristics of the client computing device and a unique client key, and at least one of the plurality of credentials based on both the received characteristics of the client computing device and a generic key. Such embodiment also includes logic configured to send, via the network, the plurality of credentials.

At least one embodiment includes logic configured to send, via the network, characteristics of the client computing device. Such embodiment also includes logic configured to receive, via the network, a plurality of credentials, at least one of the plurality of credentials based on both the characteristics of the client computing device and a unique client key, and at least one of the plurality of credentials based on both the characteristics of the client computing device and a generic key.

At least one embodiment includes a client computing device including logic configured to send, via the network, characteristics of the client computing device and receive, via the network, a plurality of credentials. Such embodiment also includes a server including logic configured to receive, via the network, the characteristics of the client computing device, generate the plurality of credentials, at least one of the plurality of credentials based on both the received characteristics of the client computing device and a unique client key, and at least one of the plurality of credentials based on both the received characteristics of the client computing device and a generic key; and to send, via the network, the plurality of credentials.

At least one embodiment includes code operable to receive, via the network, characteristics of the client computing device. Such embodiment also includes code operable to generate a plurality of credentials, at least one of the plurality of credentials based on both the received characteristics of the client computing device and a unique client key, and at least one of the plurality of credentials based on both the received characteristics of the client computing device and a generic key. Such embodiment also includes code operable to send, via the network, the plurality of credentials.

At least one embodiment includes code operable to send, via the network, characteristics of the client computing device. Such embodiment also includes code operable to receive, via the network, a plurality of credentials, at least one of the plurality of credentials based on both the characteristics of the client computing device and a unique client key, and at least one of the plurality of credentials based on both the characteristics of the client computing device and a generic key.

At least one embodiment includes means for receiving, via the network, characteristics of the client computing device. Such embodiment also includes means for generating a plurality of credentials, at least one of the plurality of credentials based on both the received characteristics of the client computing device and a unique client key, and at least one of the plurality of credentials based on both the received characteristics of the client computing device and a generic key. Such embodiment also includes means for sending, via the network, the plurality of credentials.

At least one embodiment includes means for sending, via the network, characteristics of the client computing device. At least one embodiment includes means for receiving, via the network, a plurality of credentials, at least one of the plurality of credentials based on both the characteristics of the client computing device and a unique client key, and at least one of the plurality of credentials based on both the characteristics of the client computing device and a generic key.

At least one embodiment includes receiving, via the network, a signal including a plurality of credentials, at least one of the plurality of credentials based on both the received characteristics of the client computing device and a unique client key, and at least one of the plurality of credentials based on both the received characteristics of the client computing device and a generic key. At least one embodiment includes determining the authenticity of the signal based upon the selective authentication of any of the plurality of credentials.

At least one embodiment includes sending, via the network, a signal including a plurality of credentials, at least one of the plurality of credentials based on both the characteristics of the client computing device and a unique client key, and at least one of the plurality of credentials based on both the characteristics of the client computing device and a generic key.

At least one embodiment includes sending from the client computing device, via the network, a signal including a plurality of credentials, at least one of the plurality of credentials based on both the received characteristics of the client computing device and a unique client key, and at least one of the plurality of credentials based on both the received characteristics of the client computing device and a generic key. Such embodiment also includes receiving at the server, via the network, the signal. Such embodiment also includes determining at the server, the authenticity of the signal based upon the selective authentication of any of the plurality of credentials.

At least one embodiment includes logic configured to receive, via the network, a signal including a plurality of credentials, at least one of the plurality of credentials based on both the received characteristics of the client computing device and a unique client key, and at least one of the plurality of credentials based on both the received characteristics of the client computing device and a generic key. Such embodiment includes logic configured to determine the authenticity of the signal based upon the selective authentication of any of the plurality of credentials.

At least one embodiment includes logic configured to send, via the network, a signal including a plurality of credentials, at least one of the plurality of credentials based on both the characteristics of the client computing device and a unique client key, and at least one of the plurality of credentials based on both the characteristics of the client computing device and a generic key.

At least one embodiment includes a client computing device including logic configured to send, via the network, a signal including a plurality of credentials, at least one of the plurality of credentials based on both the received characteristics of the client computing device and a unique client key, and at least one of the plurality of credentials based on both the received characteristics of the client computing device and a generic key. Such embodiment also includes a server including logic configured to receive, via the network, the signal, and determine, the authenticity of the signal based upon the selective authentication of any of the plurality of credentials.

At least one embodiment includes code operable to receive, via the network, a signal including a plurality of credentials, at least one of the plurality of credentials based on both the received characteristics of the client computing device and a unique client key, and at least one of the plurality of credentials based on both the received characteristics of the client computing device and a generic key. Such embodiment also includes code operable to determine the authenticity of the signal based upon the selective authentication of any of the plurality of credentials.

At least one embodiment includes code operable to send, via the network, a signal including a plurality of credentials, at least one of the plurality of credentials based on both the characteristics of the client computing device and a unique client key, and at least one of the plurality of credentials based on both the characteristics of the client computing device and a generic key.

At least one embodiment includes means for receiving, via the network, a signal including a plurality of credentials, at least one of the plurality of credentials based on both the received characteristics of the client computing device and a unique client key, and at least one of the plurality of credentials based on both the received characteristics of the client computing device and a generic key. At least one such embodiment also includes means for determining the authenticity of the signal based upon the selective authentication of any of the plurality of credentials.

At least one embodiment includes means for sending, via the network, a signal including a plurality of credentials, at least one of the plurality of credentials based on both the characteristics of the client computing device and a unique client key, and at least one of the plurality of credentials based on both the characteristics of the client computing device and a generic key.

At least one embodiment includes receiving, via the network, a signal including the characteristics of the client computing device. Such embodiment also includes generating a plurality of credentials, at least one of the plurality of credentials based on both the received characteristics of the client computing device and a unique client key, and at least one of the plurality of credentials based on both the received characteristics of the client computing device and a generic key. Such embodiment also includes sending, via the network, a signal including the plurality of credentials. Such embodiment also includes receiving, via the network, a signal including the plurality of credentials. Such embodiment also includes determining the authenticity of the received signal based upon the selective authentication of any of the received plurality of credentials.

At least one embodiment includes sending, via the network, a signal including characteristics of the client computing device. Such embodiment also includes receiving, via the network, a signal including a plurality of credentials, at least one of the plurality of credentials based on both the characteristics of the client computing device and a unique client key, and at least one of the plurality of credentials based on both the characteristics of the client computing device and a generic key. Such embodiment also includes sending, via the network, a signal including the received plurality of credentials.

At least one embodiment includes logic configured to receive, via the network, a signal including characteristics of the client computing device. Such embodiment also includes logic configured to generate a plurality of credentials, at least one of the plurality of credentials based on both the received characteristics of the client computing device and a unique client key, and at least one of the plurality of credentials based on both the received characteristics of the client computing device and a generic key. Such embodiment also includes logic configured to send, via the network, a signal including the plurality of credentials. Such embodiment also includes logic configured to receive, via the network, a signal including the plurality of credentials. Such embodiment also includes logic configured to determine the authenticity of the received signal including a plurality of credentials based upon the selective authentication of any of the received plurality of credentials.

At least one embodiment includes logic configured to send, via the network, a signal including characteristics of the client computing device. Such embodiment also includes logic configured to receive, via the network, a signal including a plurality of credentials, at least one of the plurality of credentials based on both the characteristics of the client computing device and a unique client key, and at least one of the plurality of credentials based on both the characteristics of the client computing device and a generic key. Such embodiment also includes logic configured to send, via the network, a signal including the received plurality of credentials.

At least one embodiment includes code operable to receive, via the network, a signal including characteristics of the client computing device. Such embodiment also includes code operable to generate a plurality of credentials, at least one of the plurality of credentials based on both the received characteristics of the client computing device and a unique client key, and at least one of the plurality of credentials based on both the received characteristics of the client computing device and a generic key. Such embodiment also includes code operable to send, via the network, a signal including the plurality of credentials. Such embodiment also includes code operable to receive, via the network, a signal including the sent plurality of credentials. Such embodiment also includes code operable to determine the authenticity of the received signal including the received plurality of credentials based upon the selective authentication of any of the received plurality of credentials.

At least one embodiment includes code operable to send, via the network, a signal including characteristics of the client computing device. Such embodiment also includes code operable to receive, via the network, a signal including a plurality of credentials, at least one of the plurality of credentials based on both the characteristics of the client computing device and a unique client key, and at least one of the plurality of credentials based on both the characteristics of the client computing device and a generic key. Such embodiment also includes code operable to send, via the network, a signal including the received plurality of credentials.

At least one embodiment includes means for receiving, via the network, a signal including characteristics of the client computing device. Such embodiment also includes means for generating a signal including a plurality of credentials, at least one of the plurality of credentials based on both the received characteristics of the client computing device and a unique client key, and at least one of the plurality of credentials based on both the received characteristics of the client computing device and a generic key. Such embodiment also includes means for sending, via the network, a signal including the plurality of credentials. Such embodiment also includes means for receiving, via the network, a signal including the sent plurality of credentials. Such embodiment also includes means for determining the authenticity of the received signal including the received plurality of credentials based upon the selective authentication of any of the received plurality of credentials.

At least one embodiment includes means for sending, via the network, a signal including characteristics of the client computing device. Such embodiment also includes means for receiving, via the network, a signal including a plurality of credentials, at least one of the plurality of credentials based on both the characteristics of the client computing device and a unique client key, and at least one of the plurality of credentials based on both the characteristics of the client computing device and a generic key. Such embodiment also includes means for sending, via the network, a signal including the received plurality of credentials.

At least one advantage of at least one embodiment includes the separation among different devices of the data used to create a credential and the cryptographic algorithm used to decrypt the credential. At least one advantage of at least one embodiment includes the introduction of a method of secure communications that does not require the installation of secure credentials at the time of manufacture. At least one advantage of at least one embodiment includes the introduction of a method of secure communications that does not require the programming of secure credentials at point of sale locations. At least one advantage of at least one embodiment includes the introduction of secure communications that does not require a person to take overt action to introduce a secure credential to a client computing device.

At least one advantage of at least one embodiment includes the ability of a device remote to the client computing device to dynamically change the procedure on how communications are authenticated. At least one advantage of at least one embodiment includes the ability of a remote server to initiate a reinstallation procedure regarding secure credentials at a client computing device. At least one advantage of at least one embodiment includes the flexibility provided by the use of a plurality of credentials in a dynamic secure communications process. At least one advantage of at least one embodiment includes the ability of a remote device to a client computing device to append, replace and/or delete credentials on a client computing device during system operations.

Other aspects, advantages, and features of the present invention will become apparent after review of the entire application, including the following sections: Brief Description of the Drawings, Detailed Description, and the claims.

BRIEF DESCRIPTION OF THE DRAWINGS

The foregoing aspects and the attendant advantages of the embodiments described herein will become more readily apparent by reference to the following detailed description when taken in conjunction with the accompanying drawings wherein.

DETAILED DESCRIPTION

The word "exemplary" is used herein to mean "serving as an example, instance, or illustration." Any embodiment described herein as "exemplary" is not necessarily to be construed as preferred or advantageous over other embodiments. Further, many embodiments are described in terms of sequences of actions to be performed by, for example, elements of a computing device. It will be recognized that various actions described herein could be performed by specific circuits (e.g., application specific integrated circuits (ASICs)), by program instructions being executed by one or more processors, or by a combination of both. Further, the embodiments described herein can additionally be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform a certain action or "code operable to" perform the described action.

The following detailed description describes methods, systems, software and apparatus used to provide secure communications between client computing devices and servers. In at least one embodiment a wireless client computing device registers with an application download server over a network by providing characteristics of the client computing device to the server and where the server provides at least one credential based on the characteristics of the client computing device and at least one other credential based on server information.

In one or more embodiments, the system used to provide secure communications between client computing devices and servers operates in conjunction with a runtime environment (API) executing on the computing device. One such runtime environment (API) is what is to be a new version of the Binary Runtime Environment for Wireless® (BREW®) software platform developed by QUALCOMM, Inc., of San Diego, Calif. In at least one embodiment in the following description, the system used to provide secure communications between client computing devices and servers is implemented on a computing device executing a runtime environment (API), such as the new version of the BREW® software platform. However, one or more embodiments of the system used to provide secure communications between client computing devices and servers are suitable for use with other types of runtime environments (APIs) that, for example, operate to control the execution of applications on wireless client computing devices.

Figure 1:
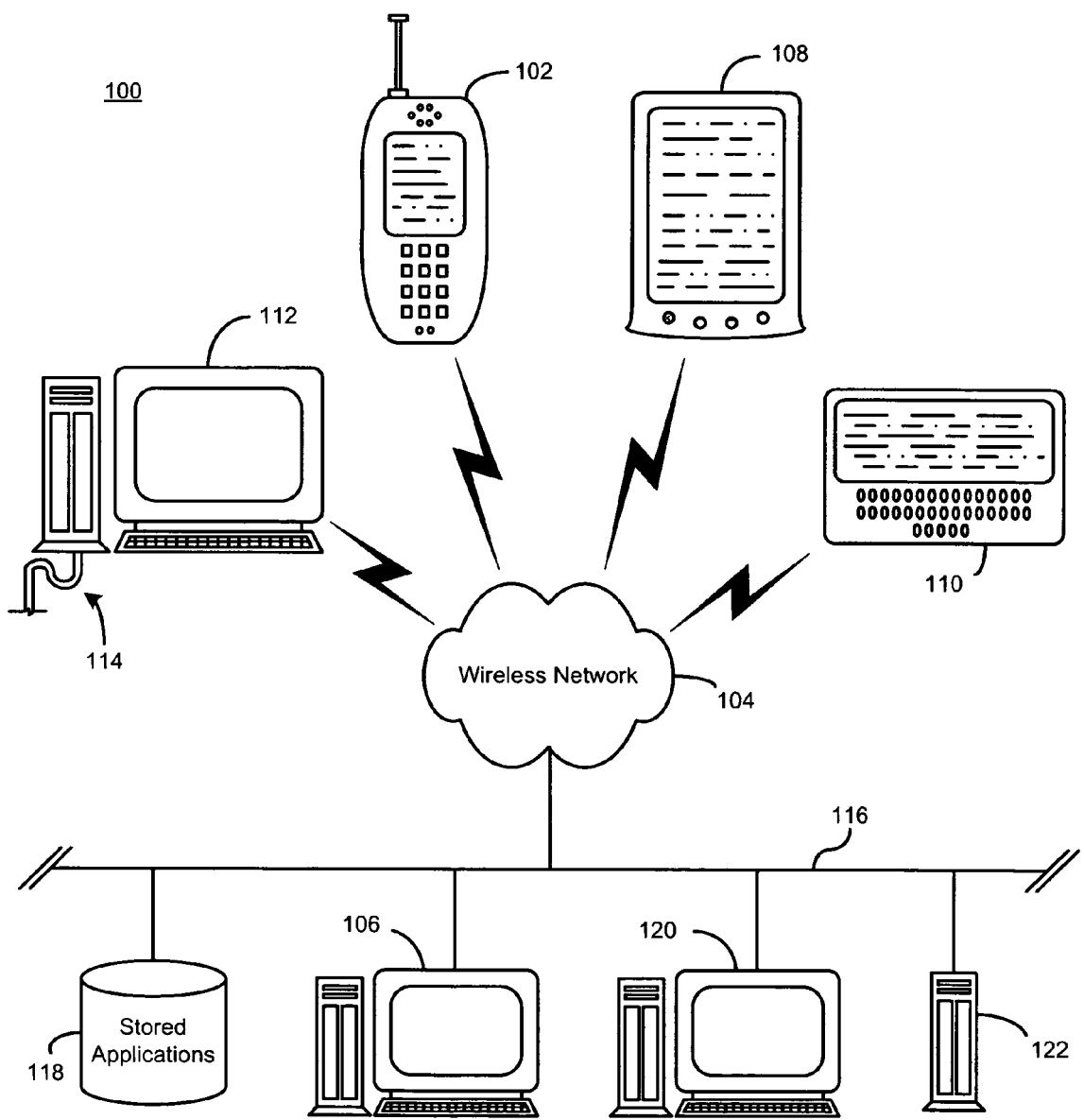
FIG. 1 is a high level diagram of one embodiment of a system for secure communications between a client computing device and a server.

FIG. 1 illustrates a block diagram of one exemplary embodiment of system 100 for the deletion and reloading of software application components on a wireless device, such as cellular telephone 102, in communication across a wireless network 104 with at least one application download server 106 that selectively transmits software applications and components to wireless devices across a wireless communication portal or other data access to the wireless network 104. As shown here, the wireless device can be a cellular telephone 102, a personal digital assistant 108, a pager 110, which is shown here as a two-way text pager, or even a separate computer platform 112 that has a wireless communication portal, and may otherwise have a wired connection 114 to a network or the Internet. The inventive system can thus be performed on any form of remote module including a wireless communication portal, including without limitation, wireless modems, PCMCIA cards, access terminals, personal computers, access terminals, telephones without a display or keypad, or any combination or sub-combination thereof.

The application download server 106 is shown here on a network 116 with other computer elements in communication with the wireless network 104. There is a second server 120 and a stand-alone server 122, and each server can provide separate services and processes to the wireless devices 102, 108, 110, 112 across the wireless network 104. There is preferably also at least one stored application database 118 that holds the software applications that are downloadable by the wireless devices 102, 108, 110, 112. Different embodiments are contemplated that locate logic to perform secure communications at any one or more of the application download server 106, second server 120 and stand-alone server 122.

Figure 2:
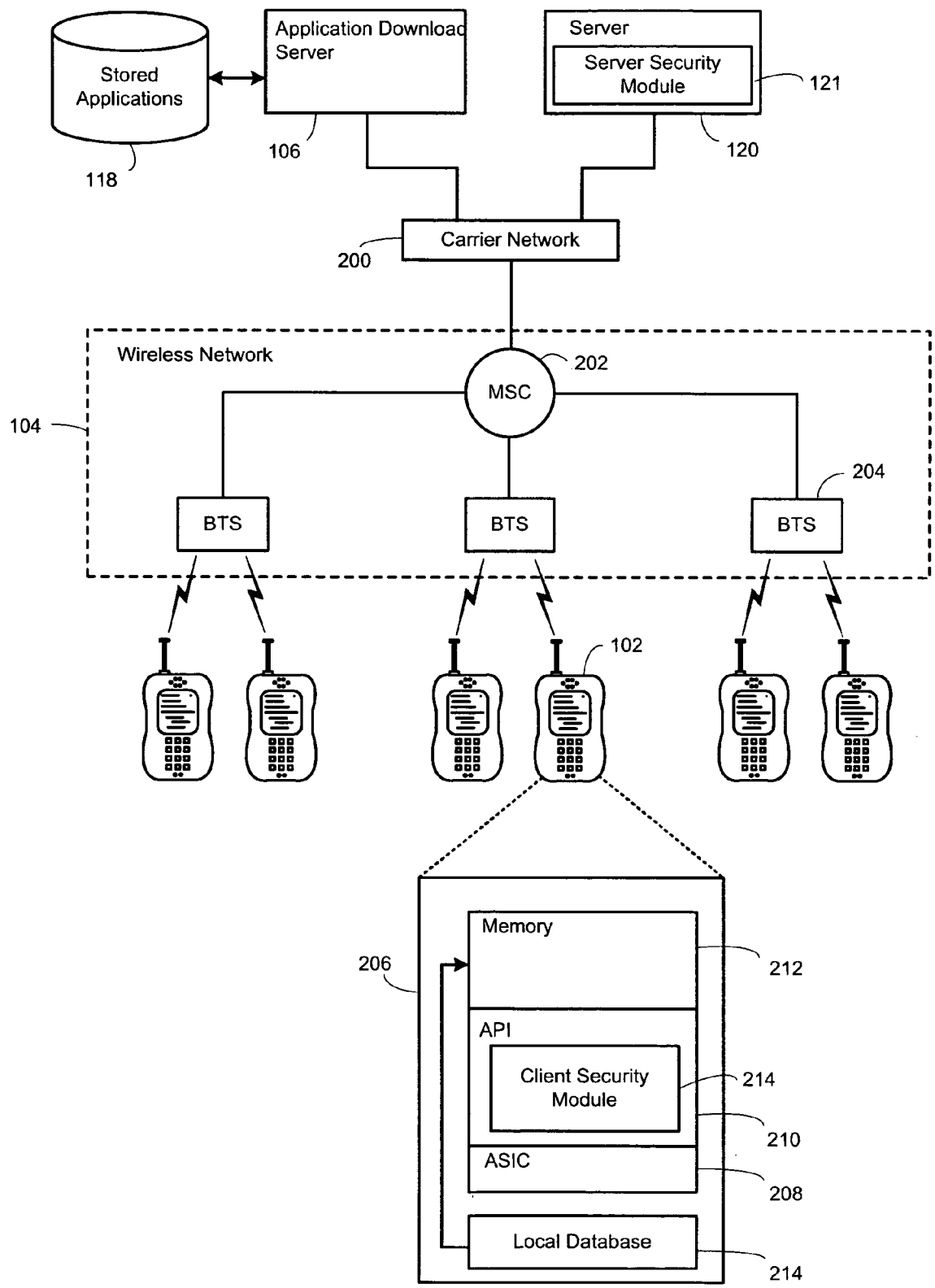
FIG. 2 is a semi-high level diagram of one embodiment of a system for secure communications between a client computing device and a server.

In FIG. 2, a block diagram is shown that more fully illustrates system 100, including the components of the wireless network 104 and interrelation of the elements of the exemplary embodiment. The system 100 is merely exemplary and can include any system whereby remote modules, such as wireless client computing devices 102, 108, 110, 112 communicate over-the-air between and among each other and/or between and among components connected via a wireless network 104, including, without limitation, wireless network carriers and/or servers. The application download server 106 and the stored application database 118, along with any other servers such as server 120 which are needed to provide cellular telecommunication services, communicate with a carrier network 200, through a data link, such as the Internet, a secure LAN, WAN, or other network. In the embodiment shown, the server 120 contains a server security 121 containing logic configured to provide for secure communications over the carrier network 200. Such server security module 121 operates in conjunction with a client security module located on a client computing device, such as wireless devices 102, 108, 110, 112, to provide secure communications.

The carrier network 200 controls messages (sent as data packets) sent to a messaging service controller ("MSC") 202. The carrier network 200 communicates with the MSC 202 by a network, the Internet and/or POTS ("plain ordinary telephone system"). Typically, the network or Internet connection between the carrier network 200 and the MSC 202 transfers data, and the POTS transfers voice information. The MSC 202 is connected to multiple base stations ("BTS") 204. In a similar manner to the carrier network, the MSC 202 is typically connected to the BTS 204 by both the network and/or Internet for data transfer and POTS for voice information. The BTS 204 ultimately broadcasts messages wirelessly to the wireless devices, such as cellular telephone 102, by short messaging service ("SMS"), or other over-the-air methods known in the art.

The wireless device, (here a wireless client computing device), such as cellular telephone 102, has a computer platform 206 that can receive and execute software applications transmitted from the application download server 106. The computer platform 206 includes an application-specific integrated circuit ("ASIC" 208), or other processor, microprocessor, logic circuit, or other data processing device. The ASIC 208 is installed at the time of manufacture of the wireless device and is not normally upgradeable. The ASIC 208 or other processor executes the application programming interface ("API") 210 layer that interfaces with any resident programs in the memory 212 of the wireless device. The memory 212 can be comprised of read-only or random-access memory (RAM and ROM), EPROM, flash cards, or any memory common to computer platforms. The API 210 also includes a client security module 214 containing logic configured to provide for secure communications over the carrier network 200. Such client security module 214 operates in conjunction with a client security module 121 to provide secure communications. The computer platform 206 also includes a local database 214 that can hold applications not actively used in memory 212. The local database 216 is typically a flash memory cell, but can be any secondary storage device as known in the art, such as magnetic media, EPROM, optical media, tape, or soft or hard disk.

The wireless client computing device, such as cellular telephone 102, accordingly downloads one or more software applications, such as games, news, stock monitors, and the like, from the application download server 106 and holds the application on the local database 216 when not in use, and uploads stored resident applications on the local database 216 to memory 212 for execution on the API 210 when so desired by the user. Further, the communications over the wireless network 104 are performed in a secure manner, at least in part, because of the interaction and operation between the client security module 214 and the server security module 121. The present inventive system and method provides such secure communication over the wireless network 104, as is further described herein.

Figure 3:
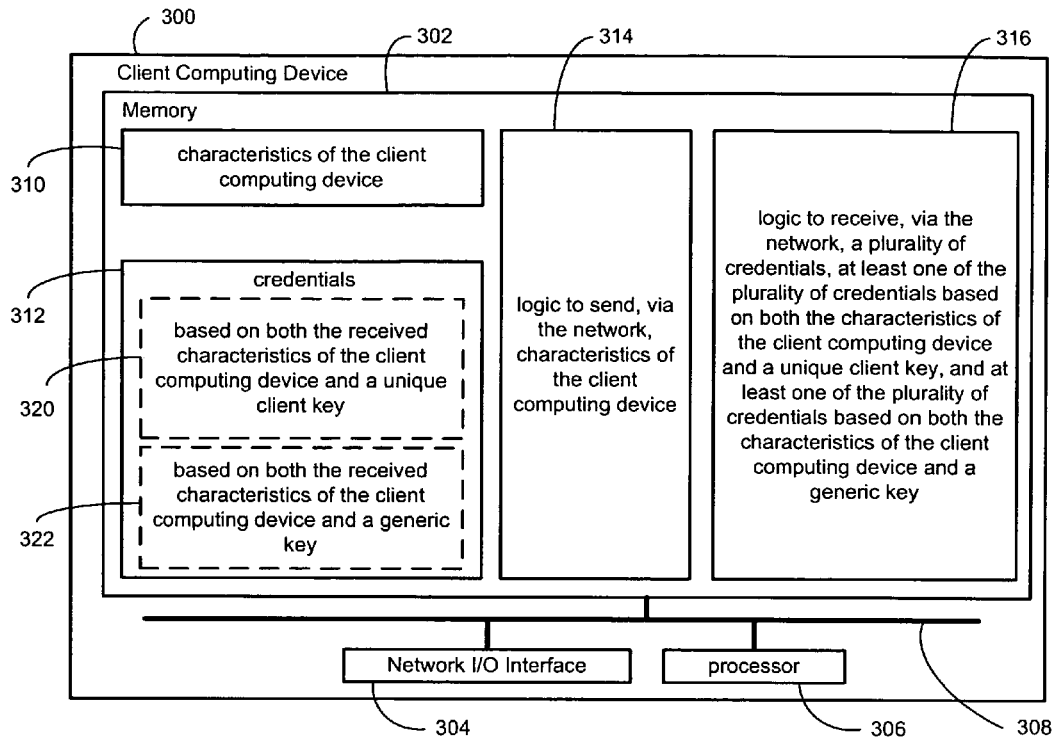
FIG. 3 is a block diagram of one embodiment of a client computing device as used in a system for secure communications between the client computing devices and a server.

FIG. 3 illustrates one exemplary embodiment of a client computing device 300 operable to provide secure communications with a remote server. As used herein "client computing device" includes, for example, one or more processing circuits executing resident configured logic, where such computing devices include, for example, microprocessors, digital signal processors (DSPs), microcontrollers, portable wireless telephones, personal digital assistants (PDAs), and paging devices, or any suitable combination of hardware, software and/or firmware containing processors and logic configured to at least perform the operations described herein directed to secure communications. The client computing device is serviced by at least one remote server with respect to at least such secure communications.

As shown in the exemplary embodiment, the client computing device 300 includes memory 302, network I/O interface 304, processor 306 and bus 308. Although the memory 302 is shown as RAM memory, other embodiments include such memory 302 as all known types of memory that are known to provide for the storing of configured logic. In addition, although memory 302 is shown as one contiguous unit of one type of memory, other embodiments use multiple locations and multiple types of memory as memory 302. The network I/O interface 304 provides input and output to devices coupled to the network via the bus 308. The processor 306 operates on instructions and data provided via the bus 308. In at least one embodiment processor 306 is part of ASIC 208.

Located in memory 302 is characteristics 310 of the client computing device 300, credentials 312, logic 314 to send, via the network, characteristics 310 of the client computing device 300, and logic 316 to receive, via the network, a plurality of credentials 312, at least one of the plurality of credentials based on both the received characteristics of the client computing device 310 and a unique client key (320), and at least one of the plurality of credentials based on both the received characteristics of the client computing device 310 and a generic key (322). In, at least one embodiment, the characteristics 310 of the client computing device 300, includes any one or more of the following: client computing device 300 phone number, client computing device 300 system identification number (SID), client computing device 300 BREW version, client computing device 300 hardware ID (e.g., electronic serial number (ESN)), client computing device 300 firmware version, carrier ID, Removable User Identity Module (RUIM) card ID, Mobile Directory Number (MDN), an Mobile Information Number (MIN), device network address (e.g. IP address), service subscriber billing account number (e.g., International Mobile Subscriber Identity (IMSI)), client computing device 300 secret key (e.g., an A-key), a user ID and a personal identification number (PIN). In other embodiments, other information is used as the characteristics 310 of the client computing device 300, where such information is useful in identifying the client computing device 300. As exemplified above, the characteristics 310 of the client computing device 300, sometimes includes characteristics 310 that is not unique in and of itself to such client computing device 300, but when combined with other characteristics 310 are useful in uniquely identifying the particular client computing device 300. Further, in at least one embodiment the at least one credential based on both the received characteristics 310 of the client computing device and the unique client key (320) is formulated by performing a one-way cryptographic operation on characteristics 310 of the client computing device 300 and the client key. In some embodiments other credentials are formulated using the same or different cryptographic algorithms, while in other embodiments certain credentials are not formulated using a cryptographic algorithm.

In at least one embodiment, the system includes credentials 312 used in authenticating signals sent across the wireless network 104. Such credentials 312 are present in memory 302 only after having at least an initial sending of the characteristics 310 of the client computing device 300 and received the corresponding credentials 312 in return. Although other embodiments use additional credentials 312, in one embodiment, the credentials 312 are made up of one credential 320 based on the sent characteristics 310 of the client computing device 300 and the unique client key (320), and another credential 322 based on both the characteristics 310 of the client computing device and a generic key (322). Multiple credentials are used such that any one or more of such credentials can be optionally used to authenticate a corresponding signal. As such, a remote server, for example, can selectively choose which credentials 312 to verify in the authentication of a signal sent by a client computing device 300.

In one embodiment multiple credentials 312 are used based on a generic key where one such credential is associated with a particular server 106, 120, 122, while another credential is based upon a generic key where one such credential is associated with a particular server farm, (e.g., a server farm associated with an application download server of a network carrier), within a multi-server farm, (e.g., a group of multiple server farms associated with one ore more application download servers of a network carrier), while another credential is based upon a generic key where such credential is associated with a multi-server farm for which the particular server farm belongs. In each of such embodiments, the generic key is used in conjunction with the characteristics 312 of the client computing device 300, to generate the unique credential. In such systems, for example, if a particular server farm, or database associated therewith, is lost, the remaining associated server farms can continue receiving and authenticating signals sent from the particular client computing device 300, by selectively choosing to authenticate only the credential 320 based on the credential associated with multi-server farm/client computing device 300 combination.

Here, because of the loss of the particular server farm, the credential associated with that particular server farm/client computing device 300 is ignored in the authentication process. As such, at least one embodiment includes the selective use of multiple credentials 312 to selectively authenticate signals such that any particular loss of data or equipment (e.g., servers and server farms) otherwise associated with one of the credentials 312, is not fatal in the continuing of the secure process of authenticating a signal sent from a particular client computing device 300. As such, depending on the availability or non-availability of server and/or server farm related components, varying strengths of authentication may be selectively applied to authenticate signals sent from a client computing device 300.

Alternatively, in at least one embodiment, selectively, a subset of multiple credentials 312 are used to authenticate a signal even though more that the subset of multiple credentials are valid and available for use. In one such embodiment, the selective use of a subset of available and valid multiple credentials 312, is performed based on a determination of a particular strength of authentication desired. In one embodiment such strength of authentication is determined based on the relative expense associated with the particular authentication scheme compared with others. In one embodiment the relative expense is in part based on the value (e.g., a revenue amount) associated with a corresponding transaction in relation to the costs (e.g., time, processing costs, etc.) associated with the authentication of such signal. For example, the system, when processing a signal representing a transaction that has a corresponding low value of one dollar, the system selectively bases its authentication strength used to authenticate the signal based on a smaller set (e.g., subset) of valid multiple credentials 312 than the system uses in authenticating another set (e.g., subset) of valid multiple credentials 312 associated with a signal representing a transaction that has a corresponding higher value of one hundred dollars. Further, because of the number of valid multiple credentials evaluated in authentication may vary (i.e., more for high revenue transactions that for lower revenue transactions), certain transactions (i.e., low revenue transactions) may be able to be verified by the system (i.e., those that require the use of less multiple credentials 312) while other transactions (i.e., those that require the use of more multiple credentials 312), are not. In other words, determining authentication based on a set of, for example, four credentials may result in authenticating one signal/transaction while a set of, for example, four credentials may result in not authenticating another signal/transaction. As such, at least one embodiment provides a dynamic authentication process where different credentials among the set of sent credentials 312, (e.g., either different in either amount or in which credential(s) used) can be used at different times to authenticate the same or different signals from any particular client computing device 300.

In at least one embodiment, the system includes logic 314 to send, via the network, characteristics 310 of the client computing device 300 and a unique client key (320). In at least one embodiment, such characteristics 310 of the client computing device 300 is sent with the purpose of having a remote receiving device receive such information where all or part of such information is used in generating the credential 320 based on the sent characteristics 310 of the client computing device 300 and a unique client key (320). In one embodiment such remote receiving device is the server 120.

In at least one embodiment, the system includes logic 316 to receive, via the network, a plurality of credentials 312, at least one of the plurality of credentials based on both the characteristics 310 of the client computing device 300 and a unique client key (320), and at least one of the plurality of credentials based on both the characteristics 310 of the client computing device 300 and a generic key (322). In at least one embodiment, such plurality of credentials 312 are sent from a remote sending device where such credentials are generated based on both characteristics 310 of the client computing device 300 that were previously sent from the client computing device 300 and based on a key uniquely associated with the remote sending device. In one embodiment such remote sending device is a server 106, 120, 122. In one embodiment the received plurality of credentials 312 are stored in memory 302 for subsequent inclusion in signals sent from the computing device. In some embodiments the stored plurality of credentials 312 are selectively replaced with new credentials based on subsequent received signals including commands to delete, append and/or replace the stored credentials.

Figure 4:
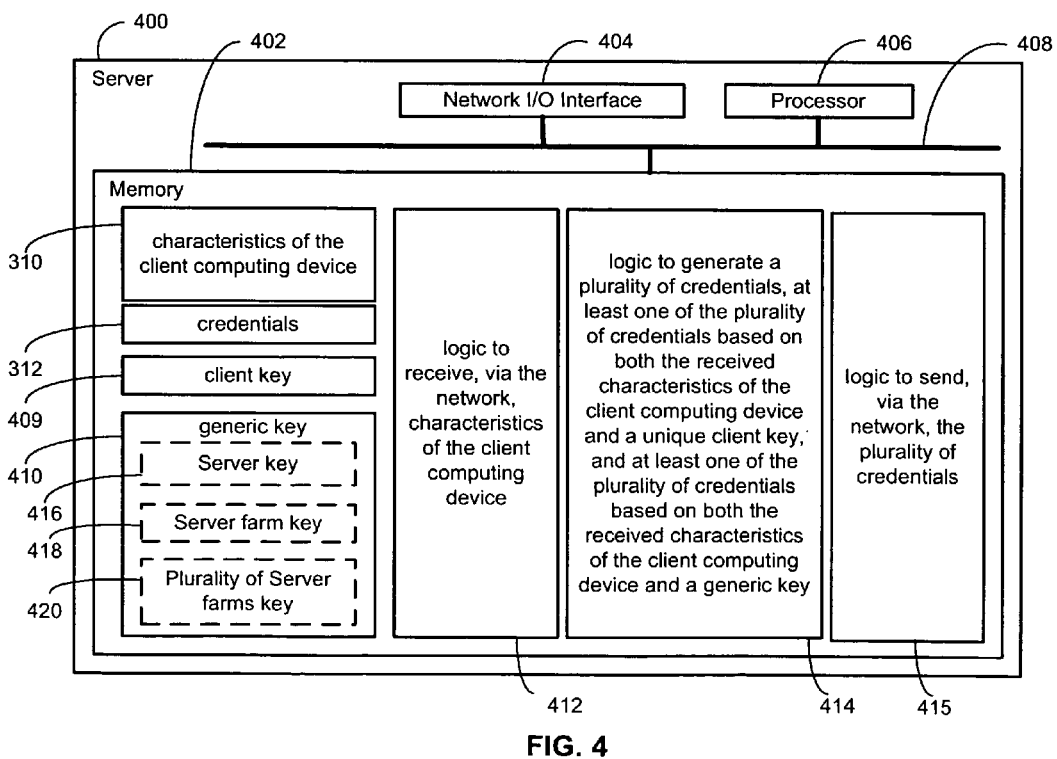
FIG. 4 is a block diagram of one embodiment of a server as used in a system for secure communications between a client computing devices and the server.

FIG. 4 illustrates one exemplary embodiment of a server 400 operable to perform secure communications with a client computing device 300. As used herein "server" includes, for example, logic executing on a computing device which provides a service to other logic executing on the same or separate computing device 300. In one embodiment, the server 400 includes logic operating on a separate computing device from a client computing device 300 and is coupled to the client computing device 300 over a network. In one embodiment such network is, at least in part, a wireless network 104. In at least one such embodiment the server 400 provides a plurality of credentials 312 to the client computing device in response to receiving a signal from the client computing device containing the characteristics 310 of the client computing device 300. In at least one embodiment the server 400 can be any of the servers 106, 120, 122 shown and described in relation to FIG. 1.

As shown in the exemplary embodiment, the server 400 includes memory 402, network I/O interface 404, processor 406 and bus 408. Although the memory 402 is shown as RAM memory, other embodiments include such memory 402 as all known types of memory that are known to provide for the storing of configured logic. In addition, although memory 402 is shown as one contiguous unit of one type of memory, other embodiments use multiple locations and multiple types of memory as memory 402. The network I/O interface 404 provides input and output to devices coupled to the network via the bus 408. The processor 406 operates on instructions and data provided via the bus 408.

Located in memory 402 is characteristics 310 of the client computing device 300, credentials 312, client key 409, generic key 410, logic 412 to receive, via the network, characteristics of the client computing device 300, logic 414 to generate a plurality of credentials 312, at least one of the plurality of credentials based on both the received characteristics 310 of the client computing device 300 and a unique client key 409, and at least one of the plurality of credentials based on both the received characteristics 310 of the client computing device 300 and a generic key 410, and logic 415 configured to send, via the network, the plurality of credentials 312. In at least one embodiment the unique client key 409 represents a unique key associated with the particular client computing device 300 and is not otherwise associated with any other device, client, server, etc. In at least one embodiment the server generates this unique client key 409 at the time of registration that is associated with the particular client computing device 300. For each client computing device 300 associated with server 400 there is a separate and unique client key 409 stored in or that is otherwise accessible to server 400. In one embodiment such unique client keys 409 are stored in a database located on the server 400. In some embodiments no credentials are generated based on a client key 409, and as such, rely solely on credentials based off of one or more generic keys 410. This is the case, for example, where a server 400 does not have available a database to store multiple unique client keys 409.

In at least one embodiment, generic key 410 includes a server key 416 associated with a server. The server key 410 contains a unique key associated with a particular server. Such server key 410 can be combined with the characteristics 310 of the client computing device 300 to generate a server based credential. In another embodiment, generic key 410 includes a server farm key 418 associated with a particular server farm. Such server farm key 418 can be combined with characteristics 310 of the client computing device 300 to generate a server farm based credential. In another embodiment, generic key 410 includes a plurality of server farms key 420 associated with a particular group of a plurality of server farms. Such plurality of server farms key 420 can be combined with characteristics 310 of the client computing device 300 to generate a plurality of server farms based credential.

In at least one embodiment, the system includes logic 412 to receive, via the network, characteristics 310 of the client computing device 300. In at least one embodiment, such characteristics 310 of the client computing device 300 is received for the purpose of generating the credential 320 based on the sent characteristics 310 of the client computing device 300 and a unique client key 409 where such credentials 320 are returned to the sending device for use in authenticating subsequent signals sent from such device. In one embodiment such sending device is the client computing device 300. In at least one embodiment such client computing device 300 may be any of the wireless devices 102, 108, 110, 112 described in and shown in FIG. 1.

In at least one embodiment, the system includes logic 414 to generate a plurality of credentials 312, at least one of the plurality of credentials based on both the received characteristics 310 of the client computing device 300 and a unique client key 409, and at least one of the plurality of credentials based on both the received characteristics 310 of the client computing device 300 and a generic key 410. In one embodiment the received characteristics 310 of the client computing device 300 is sent from a remote device. In one embodiment such remote sending device is a server 106, 120, 122. In one embodiment the generated plurality of credentials 312 are stored in memory 302 for subsequent inclusion in signals sent from the server 400 associated with a client registration signal. In at least one embodiment the stored plurality of credentials 312 are used to compare with credentials embedded in incoming signals to determine the incoming signals authenticity. In some embodiments the stored plurality of credentials 312 are selectively modified (i.e., replaced with new credentials) and such modifications are transmitted to remote devices including associated commands, such as delete, append and replace, that allows for the remote device to modify its corresponding credentials.

In at least one embodiment the logic 414 to generate a plurality of credentials 312, at least one of the plurality of credentials based on both the received characteristics 310 of the client computing device 300 and a unique client key 409, and at least one of the plurality of credentials based on both the received characteristics 310 of the client computing device 300 and a generic key 410, includes additional logic (not shown) that operates to generate more or less credentials based on server 400 related circumstances. In one such embodiment the server 400 detects the loss of credentials and/or that certain credentials have been compromised, and in response operates to generate replacement credentials that will be subsequently sent to the client computing device 300. In another embodiment, the server 400, in response to receiving a first set of credentials 312 from a client computing device 300, wherein the server 400 is unable to verify all such credentials, and further in response to receiving a second set of a credentials 312 from the client computing device 300, wherein the server 400 is now able to verify such second set of credentials 312, the server 400 then operates to generate a new credential 312. In another embodiment, the server 400, in response to receiving a first set of (weak) credentials 312 from a client computing device 300, wherein the server 400 is only able to verify a limited set of credentials 312, the server 400 then operates to generate one or more new credentials 312 to be sent to the client computing device 300 as a way of strengthening the set of credentials 312 transmitted from the client computing device 300.

Figure 5:
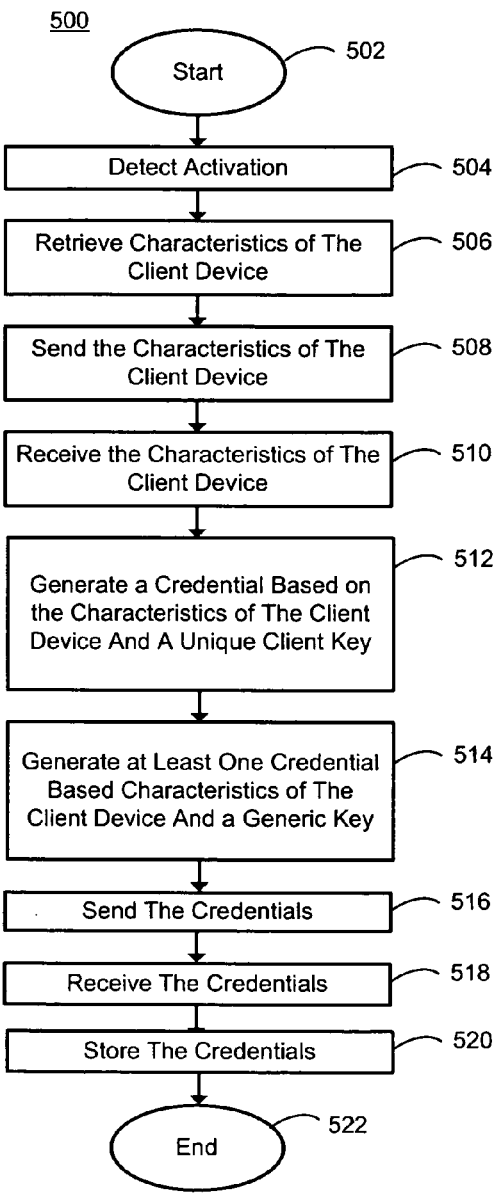
FIG. 5 is a flowchart illustrating one embodiment of a system for secure communications between a client computing device and a server.

FIG. 5 illustrates one exemplary embodiment of a method 500 for providing secure communications. Method 500 begins at start step 502. In one embodiment the process continues with step 504 where a client computing device 300 detects activation of itself. Next, in step 506, and in response to the detection of the activation of the client computing device 300, the client computing device 300 operates to retrieve characteristics 310 of the client computing device 300. Once retrieved, the client computing device 300, in step 508, operates to send the characteristics 310 of the client computing device 300, via the network. Next, in step 510, the server 400, operates to receive the sent characteristics 310 of the client computing device 300. Once the server 400 has received the sent characteristics 310 of the client computing device 300, the system operates such that in step 512 the server 400 generates a credential 320 based on the characteristics 310 of the client computing device 300 and a unique client key 409. Also once the server 400 has received the sent characteristics 310 of the client computing device 300, the system operates such that in step 514 the server 400 generates at least one credential 322 based on the characteristics 310 of the client computing device 300 and a generic key 410.

Once the credentials 312 have been generated then the server 400 operates, in step 516, to send the credentials 312 to the client computing device 300. After sending the credentials 312 in step 516, the system, in step 518, operates such that the client computing device receives the credentials 312. Next, in step 520, the system operates such that the client computing device 300 stores the credentials 312 in memory 302. The final step of method 500 is step 522. In at least one embodiment, one or more of the steps of method 500 are performed in a secure mode. For example, steps 506, 508, 516, 518 and 520, in one embodiment, are performed under a secure mode at the client computing device. Such secure mode operates to prevent unwanted snooping of data by unauthorized programs and unauthorized entities. In one embodiment the secure mode includes the use of a secure file system. Such secure mode operations may be of any number of currently known techniques known in the art.

Figure 6:
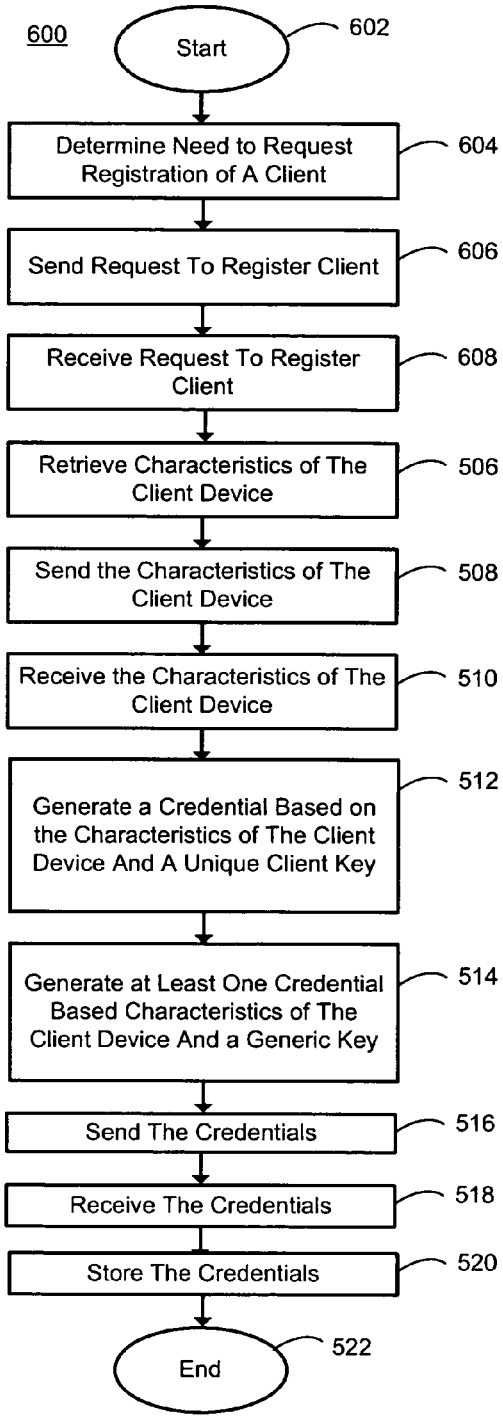
FIG. 6 is a flowchart illustrating one embodiment of a system for secure communications between a client computing device and a server.

FIG. 6 illustrates one exemplary embodiment of a method 600 for providing secure communications. Method 600 begins at start step 602 and continues with step 604 where the system operates to determine, at the server 400, the need to request registration from a client computing device 300. Such need for registration can be based on any number of factors determined by the server 400. For example, the server 400 may detect problems communicating with the client computing device 300, and in response, may determine the need for such a registration. Likewise, the server 400 may detect other problems that effect secure communications, and in response, determine the need for registration of the client computing device 300, (i.e., the server keys are determined to be compromised and therefore a process to re-register all the client computing devices is initiated.) After it is determined that there is a need to request registration from the client computing device 300, the server 400, in step 606, sends a request to register to the client computing device 300. In response, the client computing device 300, in step 608, receives the request to register the client computing device 300. Once receiving the request to register, the client computing device 300 then follows the steps outlined above including steps 506, 508, 510, 512, 514, 516, 518, 520 and 522 and performs the associated functionality.

Figure 7:
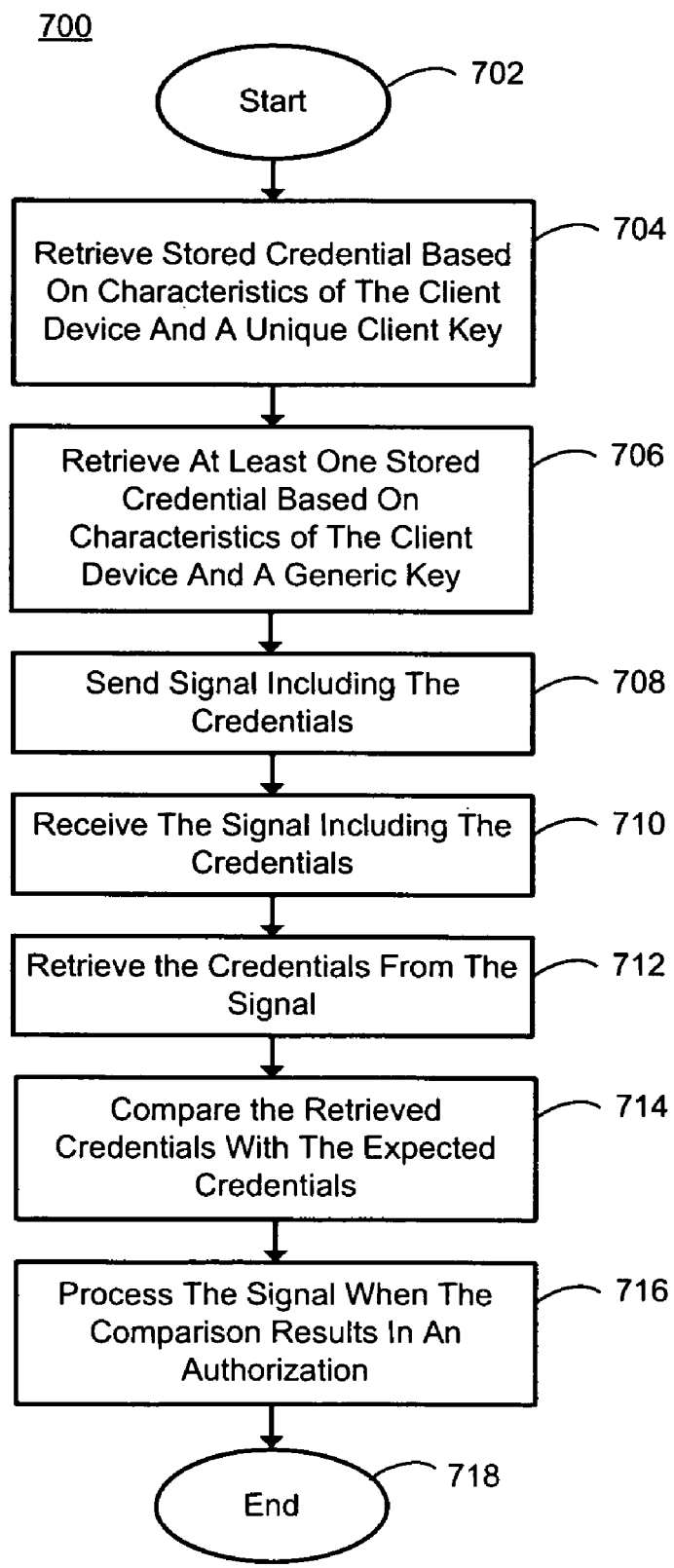
FIG. 7 is a flowchart illustrating one embodiment of a system for secure communications between a client computing device and a server.

FIG. 7 illustrates one exemplary embodiment of a method 700 for providing secure communications. More specifically, method 700 is directed to the sending of a message containing the stored credentials 312. Method 700 begins at start step 702 and continues with step 704 where the client computing device 300 operates to retrieve, from memory 302, a stored credential 320 based on characteristics 310 of the client computing device 300 and a unique client key 409. The method 700 also includes a step 706 where the client computing device 300 retrieves, from memory 302, at least one stored credential 322 based on characteristics 310 of the client computing device 300 and a generic key 410. Once the stored credentials 312 are retrieved, the client computing device 300 operates, in step 708, to send a signal that includes the credentials 312 over the network. In response to the sending of the signal including the credentials 312, the server 400, in step 710, receives such signal. Next, in step 712, the server 400 operates to retrieve the credentials 312 from the signal. Once the credentials 312 are retrieved, the server 400 then operates to compare, in step 714, the retrieved credentials 312 with the expected credentials. In one embodiment the expected credentials are stored on the server 400 and are used to compare with the retrieved credentials 312 when the corresponding signal is received. Next, in response to the comparison of step 714 yielding a match between the expected credentials for the client computing device 300 and the credentials retrieved from the received signal, the server 400 proceeds, in step 716, to process the associated signal as an authorized signal. Method 700 ends at node 718.

Figure 8:
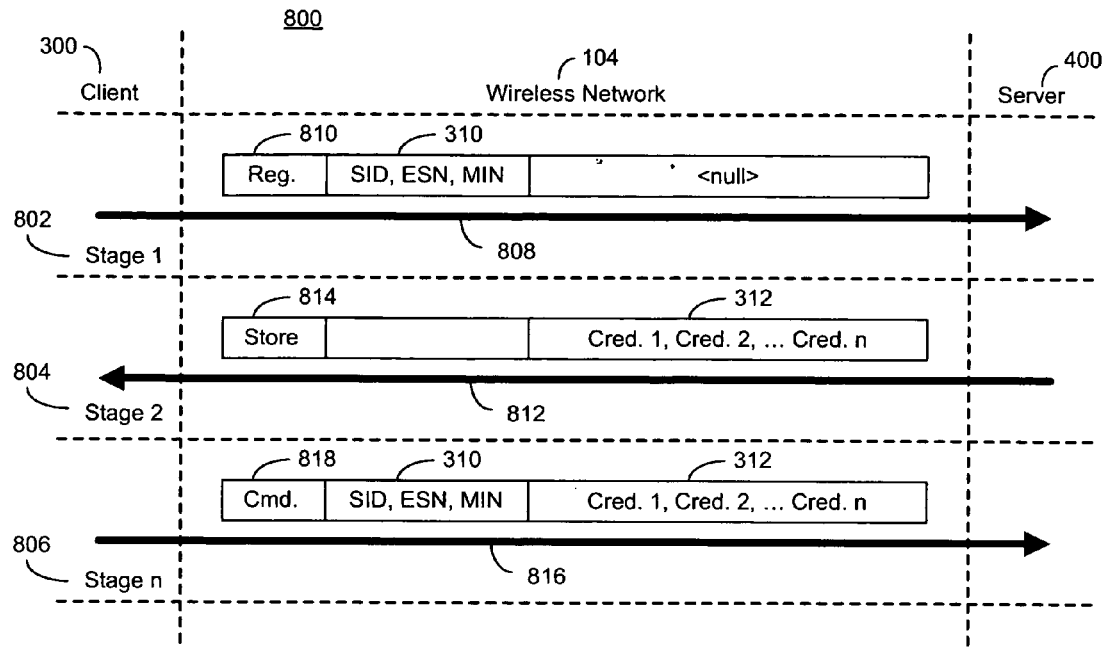
FIG. 8 is a diagram illustrating one embodiment of a procedure using signals to initiate secure communications between a client computing device computing devices and a server.

FIG. 8 illustrates one exemplary embodiment of a process 800 for providing secure communications between a client computing device 300 and a server 400. As shown, three stages, stage 1 802, stage 2 804 and stage n 806 demonstrate successive transmissions between the client computing device 300 and server 400 that establish and begin secure transmissions over a wireless network 104. At stage 1 802 the client computing device 300 transmits a signal 808 containing a registration command 810 and characteristics 310 of the client computing device 300. In response to the signal 808, after performing processing at the server that includes the generation of credentials 312, the server 400, at stage 2 804, transmits a corresponding signal 812 containing a store command 814 along with the generated credentials 312. In at least one embodiment, such signals are located in the signal in a hierarchical fashion. In response to the signal 812, after performing processing at the client computing device 300 where the sent credentials 312 are stored in the memory 302 of the client computing device 300, the client computing device 300 generates, at stage n 806, a signal 816 containing some type of command 818, the characteristics 310 of the client computing device 300, the received credentials 312 and delivery data (not shown). In at least one embodiment the characteristics 310 of the client computing device 300 and the received credentials 312 are always present in signal 816. The signal 816 represents a standard secure signal sent from client computing device 300 to server 400 that are each authorized at the server using at least the credentials 312.

Figure 9:
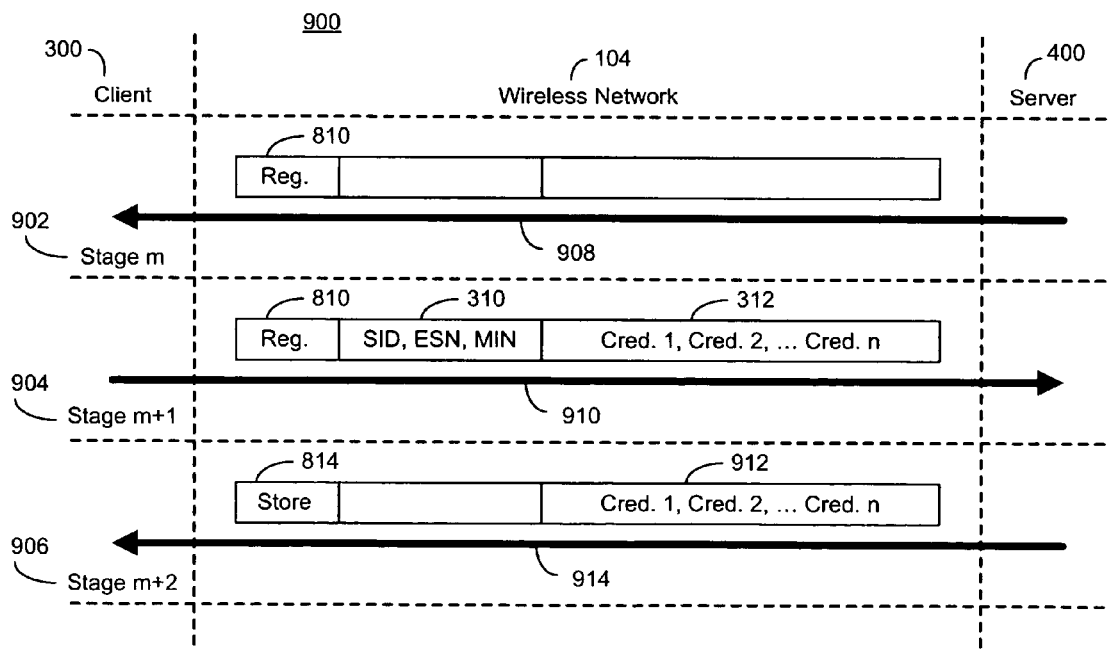
FIG. 9 is a diagram illustrating one embodiment of a procedure using signals to re-initialize secure communications between a remote computing device and a server.

FIG. 9 illustrates one exemplary embodiment of a process 900 for providing secure communications between a client computing device 300 and a server 400. As shown, three stages, stage m 902, stage m+1 904 and stage m+2 906 demonstrate successive transmissions between the client computing device 300 and server 400 that re-establish secure transmissions over a wireless network 104 (re-registration) during an already initiated secure transmission interaction. One embodiment initiates a re-registration sequence in response to a security breach and/or other situations where client credentials are desired to be remotely updated. At stage m 902 the server 400 transmits a signal 908 containing a registration command 810. In response to signal 908, after performing processing at the client computing device 300 that includes the retrieval of the characteristics 310 of the client computing device 300, the client computing device 300, at stage m+1 904, transmits a corresponding signal 910 containing a registration command 810 along with the characteristics 310 of the client computing device 300 and the generated credentials 312. In response to signal 910, after performing processing at the server where new credentials 912 are generated based at least upon the sent characteristics 310 of the client computing device 300, the server 400 sends, at stage n 906, a signal 914 containing some store command 814 and the generated credentials 912. The signal 914 represents a signal similar to that shown in FIG. 8 at stage 2 where the signal 812 represents the sending of the generated credentials from the server 400 to the client computing device 300 to establish a new secure transmission configuration. In some embodiments no store command 814 need be included as simply the receiving of the set of credentials is enough to initiate the storing of such credentials 912.

Figure 10:
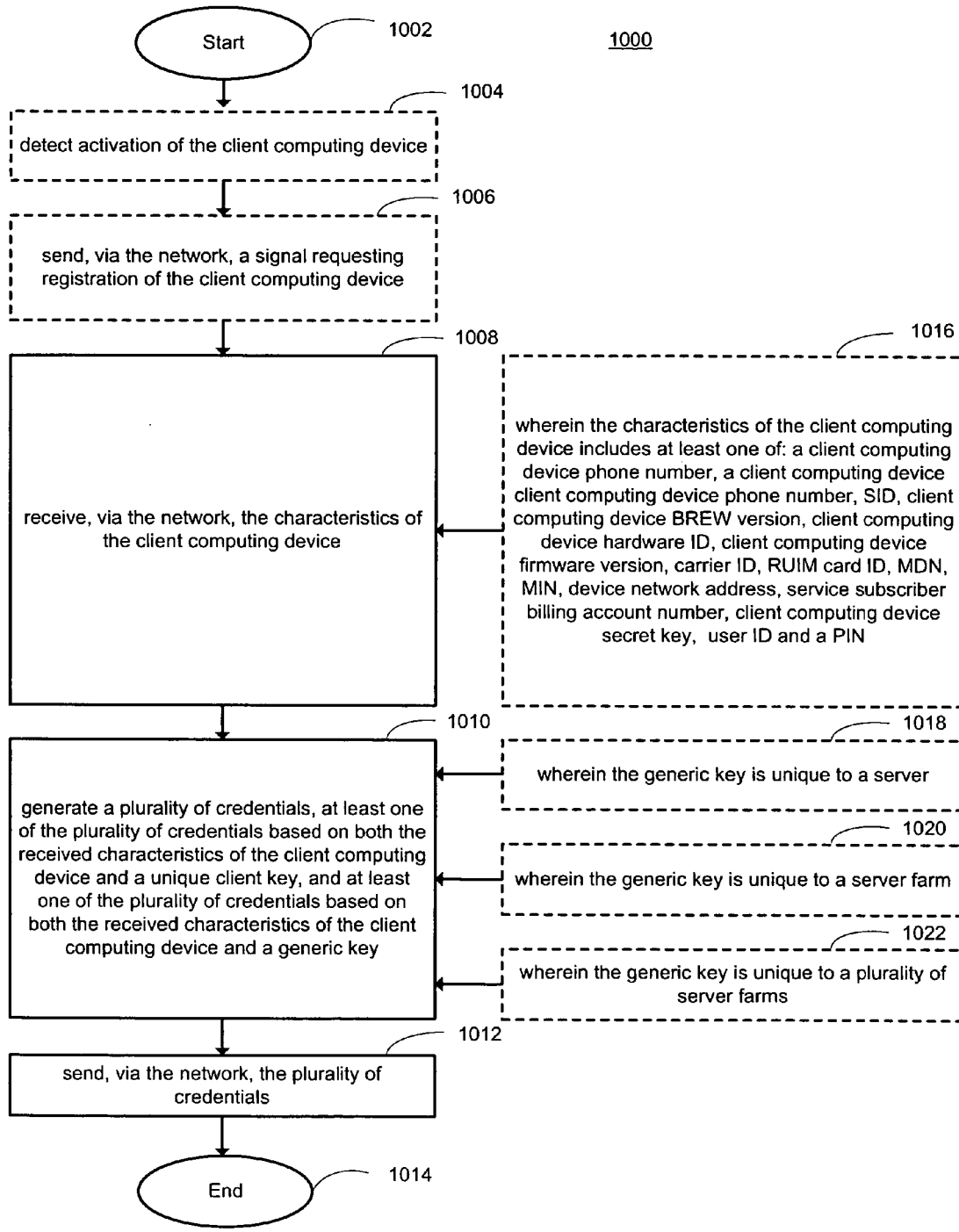
FIG. 10 is a flow chart illustrating one exemplary embodiment of a method of providing secure communications between a client computing device and a server.

FIG. 10 illustrates one exemplary embodiment of a method 1000 of providing secure communications between a client computing device 300 and a server 400. Method 1000 begins at start step 1002. In one embodiment the process continues with optional step 1004 where the method includes the detecting the activation of the client computing device 300. Also, in one embodiment optional step 1006 is included in which the method includes the sending, via the network, a signal requesting registration of the client computing device 300. Included in at least one embodiment is step 1008 in which the method further includes receiving, via the network, the characteristics 310 of the client computing device 300. Following step 1008 is step 1010 in which the process includes generating a plurality of credentials 312, at least one of the plurality of credentials 320 based on the received characteristics 310 of the client computing device 300 and a unique client key and at least one of the plurality of credentials 322 based on the received characteristics 310 of the client computing device 300 and a generic key 410. Next, step 1012 includes sending, via the network, the plurality of credentials 312. Following step 1012 is the end step 1014.

In addition to the above steps, method 1000 also includes optional steps 1016, 1018, 1020 and 1022, each of which are used optionally in conjunction with existing steps. Optional step 1016 modifies step 1008 where the method further operates wherein the characteristics of the client computing device 300 includes at least one of: a client computing device phone number, a client computing device client computing device phone number, SID, client computing device BREW version, client computing device hardware ID, client computing device firmware version, carrier ID, RUIM card ID, MDN, MIN, device network address, service subscriber billing account number, client computing device secret key, user ID and a PIN. Optional step 1018 modifies step 1010 where the method further operates wherein the generic key 410 is unique to a server. Next, optional step 1020 modifies step 1020 where the method further operates wherein the generic key 410 is unique to a server farm. Next, optional step 1022 modifies step 1020 where the method further operates wherein the generic key 410 is unique to a plurality of server farms.

Figure 11:
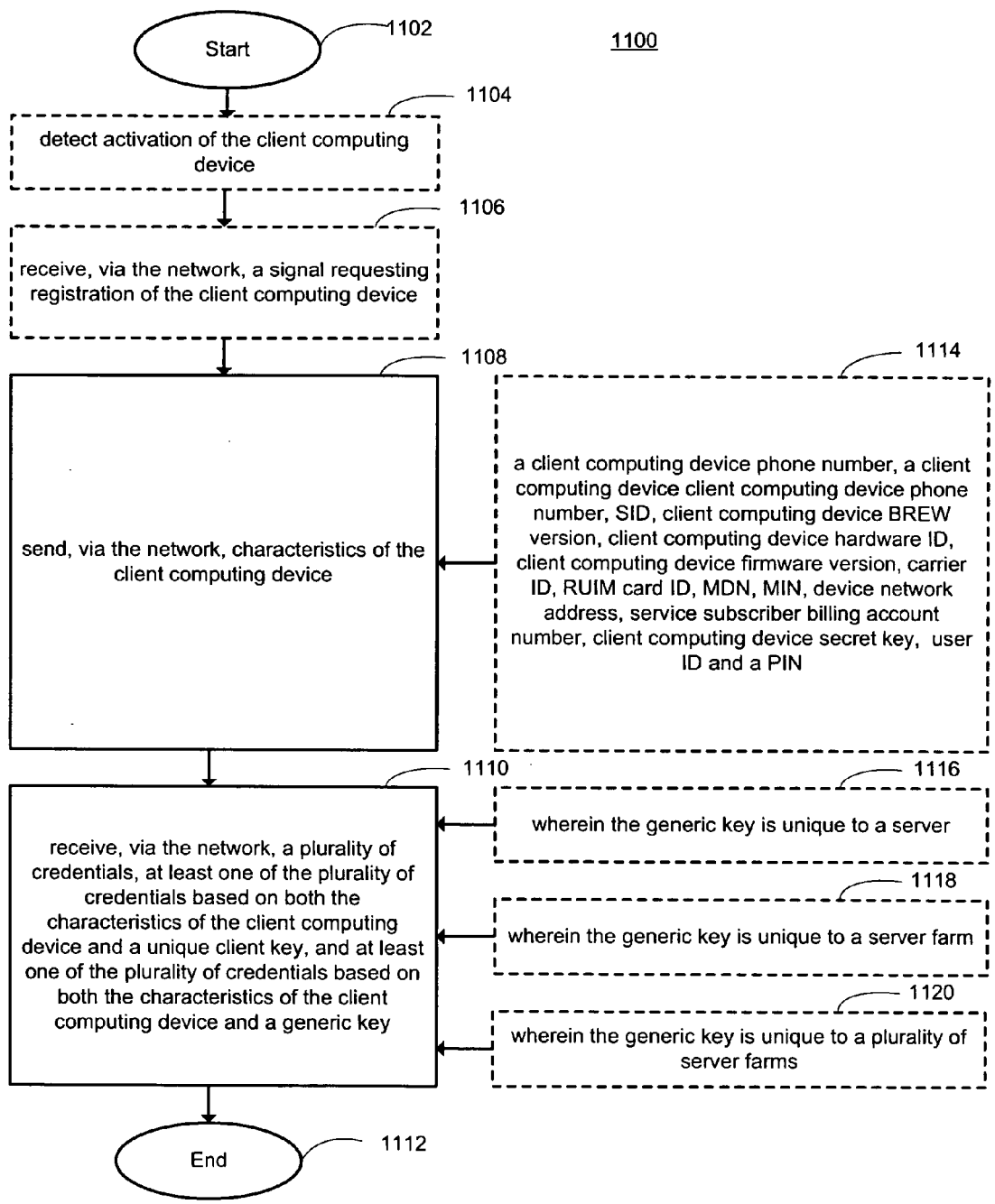
FIG. 11 is a flow chart illustrating one exemplary embodiment of a method of providing secure communications between a client computing device and a server.

FIG. 11 illustrates one exemplary embodiment of a method 1100 of providing secure communications between a client computing device 300 and a server 400. Method 1100 begins at start step 1102. In one embodiment the process continues with optional step 1104 where the method includes the detecting activation of the client computing device 300. Also, in one embodiment optional step 1006 is included in which the method includes receiving, via the network, a signal requesting registration of the client computing device 300. Included in at least one embodiment is step 1108 where the method includes sending, via the network, characteristics 310 of the client computing device 300. Following step 1108 is step 1110 in which the method operates to receive, via the network, a plurality of credentials 322, at least one of the plurality of credentials based on both the characteristics 310 of the client computing device and a unique client key 409, and at least one of the plurality of credentials based on both the characteristics 310 of the client computing device and a generic key 410. Following step 1110 is end step 1112.

In addition to the above steps, method 1100 also includes optional steps 1114, 1116, 1118 and 1120, each of which are used optionally in conjunction with existing steps. Optional step 1114 modifies step 1108 where the method further operates wherein the characteristics of the client computing device 300 includes at least one of: a client computing device phone number, a client computing device client computing device phone number, SID, client computing device BREW version, client computing device hardware ID, client computing device firmware version, carrier ID, RUIM card ID, MDN, MIN, device network address, service subscriber billing account number, client computing device secret key, user ID and a PIN. Optional step 1116 modifies step 1110 where the method further operates wherein the generic key 410 is unique to a server. Next, optional step 1118 modifies step 1110 where the method further operates wherein the generic key 410 is unique to a server farm. Next, optional step 1120 modifies step 1110 where the method further operates wherein the generic key 410 is unique to a plurality of server farms.

Figure 12:
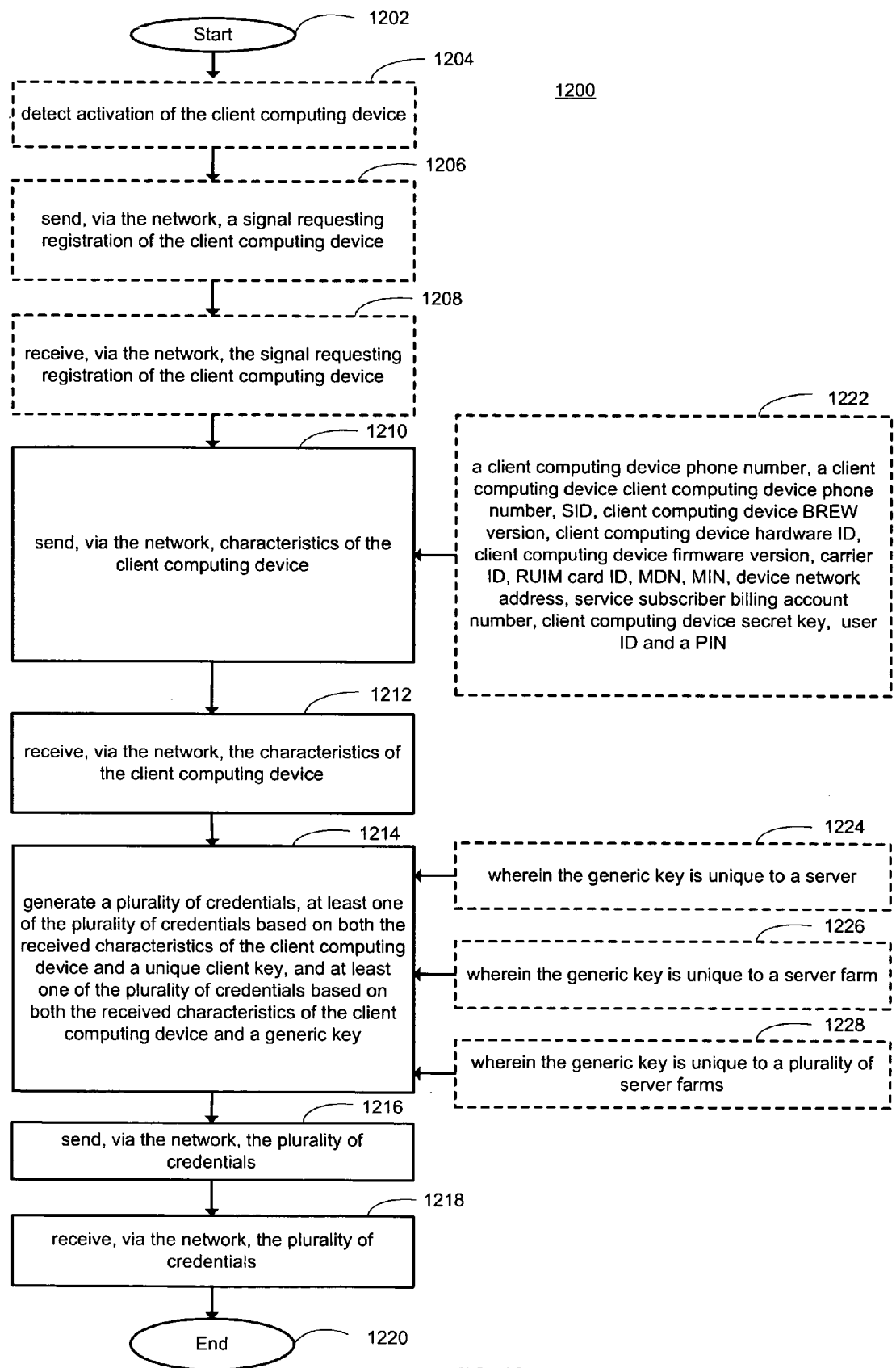
FIG. 12 is a flow chart illustrating one exemplary embodiment of a method of providing secure communications between a client computing device and a server.

FIG. 12 illustrates one exemplary embodiment of a method 1200 of providing secure communications between a client computing device 300 and a server 400. Method 1200 begins at start step 1202. In one embodiment the process continues with optional step 1204 where the method includes detecting activation of the client computing device 300. In one embodiment optional step 1206 is included in which the method sends, via the network, a signal requesting registration of the client computing device 300. In one embodiment, another optional step 1208 in which the method operates to receive, via the network, the signal requesting registration of the client computing device 300. One embodiment includes step 1210 in which the method operates to send, via the network, characteristics 310 of the client computing device 300. Following step 1210 is step 1212 in which the method operates to receive, via the network, the characteristics 310 of the client computing device 300. Following step 1212 is step 1214 in which the method operates to generate a plurality of credentials 322, at least one of the plurality of credentials based on both the received characteristics 310 of the client computing device 300 and a unique client key 409, and at least one of the plurality of credentials based on both the received characteristics 310 (and unique key per client) of the client computing device 300 and a generic key 410. Following step 1214 is step 1216 in which the method operates to send, via the network, the plurality of credentials 312. Following step 1216 is step 1218 in which the method operates to receive, via the network, the plurality of credentials 312. Following step 1218 is end step 1220.

In addition to the above steps, method 1200 also includes optional steps 1222, 1224, 1226 and 1228, each of which are used optionally in conjunction with existing steps. Optional step 1222 modifies step 1210 where the method further operates wherein the characteristics of the client computing device 300 includes at least one of: a client computing device phone number, a client computing device client computing device phone number, SID, client computing device BREW version, client computing device hardware ID, client computing device firmware version, carrier ID, RUIM card ID, MDN, MIN, device network address, service subscriber billing account number, client computing device secret key, user ID and a PIN. Optional step 1224 modifies step 1214 where the method further operates wherein the generic key 410 is unique to a server. Next, optional step 1226 modifies step 1214 where the method further operates wherein the generic key 410 is unique to a server farm. Next, optional step 1228 modifies step 1214 where the method further operates wherein the generic key 410 is unique to a plurality of server farms.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. A software module may reside in RAM memory, flash memory, ROM memory, PROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a computing device or user terminal. In the alternative, the processor and the storage medium may reside as discrete components in a computing device or user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for providing secure communications between a client computing device and a server, the client computing device and server coupled to a network, comprising:
    receiving, via the network, characteristics of the client computing device;
    generating a plurality of credentials, at least one of the plurality of credentials based on both the received characteristics of the client computing device and a unique client key, and at least one of the plurality of credentials based on both the received characteristics of the client computing device and a generic key; and
    sending, via the network, the plurality of credentials.

2. The method of claim 1, wherein the generic key is unique to a server.

3. The method of claim 1, wherein the generic key is unique to a server farm.

4. The method of claim 1, wherein the generic key is unique to a plurality of server farms.

5. The method of claim 1, wherein the characteristics of the client computing device includes at least one of: a client computing device phone number, SID, client computing device BREW version, client computing device hardware ID, client computing device firmware version, carrier ID, RUIM card ID, MDN, MIN, device network address, service subscriber billing account number, client computing device secret key, user ID and a PIN.

6. The method of claim 1, further comprising:
    sending, via the network, a signal requesting registration of the client computing device;
    wherein the receiving of the characteristics of the client computing device operates in response to the sending the signal requesting registration of the client computing device.

7. The method of claim 1, wherein the receiving of the characteristics of the client computing device operates in response to activation of the client computing device.

8. A method for providing secure communications between a client computing device and a server, the remote client computing device and server coupled to a network, comprising:
    sending, via the network, characteristics of the client computing device; and
    receiving, via the network, a plurality of credentials, at least one of the plurality of credentials based on both the characteristics of the client computing device and a unique client key, and at least one of the plurality of credentials based on both the characteristics of the client computing device and a generic key.

9. The method of claim 8, wherein the generic key is unique to a server.

10. The method of claim 8, wherein the generic key is unique to a server farm.

11. The method of claim 8, wherein the generic key is unique to a plurality of server farms.

12. The method of claim 8, wherein the characteristics of the client computing device includes at least one of: a client computing device phone number, SID, client computing device BREW version, client computing device hardware ID, client computing device firmware version, carrier ID, RUIM card ID, MDN, MIN, device network address, service subscriber billing account number, client computing device secret key, user ID and a PIN.

13. The method of claim 8, further comprising:
    receiving, via the network, a signal requesting registration of the client computing device;
    wherein the sending of the characteristics of the client computing device operates in response to the receiving the signal requesting registration of the client computing device.

14. The method of claim 8, further comprising:
    detecting the activation of the client computing device;
    wherein the sending of the characteristics of the client computing device operates in response to detecting the activation of the client computing device.

15. A method for providing secure communications between a client computing device and a server, the remote client computing device and server coupled to a network, comprising:
    sending from the client computing device, via the network, characteristics of the client computing device;
    receiving at the server, via the network, the characteristics of the client computing device;
    generating a plurality of credentials, at least one of the plurality of credentials based on both the received characteristics of the client computing device and a unique client key, and at least one of the plurality of credentials based on both the received characteristics of the client computing device and a generic key;
    sending from the server, via the network, the plurality of credentials; and
    receiving at the client computing device, via the network, the plurality of credentials.

16. The method of claim 15, wherein the generic key is unique to at least one of: a server, a server farm and a plurality of server farms.

17. The method of claim 15, wherein the characteristics of the client computing device includes at least one of: a client computing device phone number, SID, client computing device BREW version, client computing device hardware ID, client computing device firmware version, carrier ID, RUIM card ID, MDN, MIN, device network address, service subscriber billing account number, client computing device secret key, user ID and a PIN.

18. A server for processing secure communications with a client computing device over a network, comprising:
   logic configured to receive, via the network, characteristics of the client computing device;
   logic configured to generate a plurality of credentials, at least one of the plurality of credentials based on both the received characteristics of the client computing device and a unique client key, and at least one of the plurality of credentials based on both the received characteristics of the client computing device and a generic key; and
   logic configured to send, via the network, the plurality of credentials.

19. The server of claim 18, wherein the generic key is unique to a server.

20. The server of claim 18, wherein the generic key is unique to a server farm.

21. The server of claim 18, wherein the generic key is unique to a plurality of server farms.

22. The server of claim 18, wherein the characteristics of the client computing device includes at least one of: a client computing device phone number, SID, client computing device BREW version, client computing device hardware ID, client computing device firmware version, carrier ID, RUIM card ID, MDN, MIN, device network address, service subscriber billing account number, client computing device secret key, user ID and a PIN.

23. A client computing device for processing secure communications with a server over a network, comprising:
   logic configured to send, via the network, characteristics of the client computing device; and
   logic configured to receive, via the network, a plurality of credentials, at least one of the plurality of credentials based on both the characteristics of the client computing device and a unique client key, and at least one of the plurality of credentials based on both the characteristics of the client computing device and a generic key.

24. The client computing device of claim 23, wherein the generic key is unique to a server.

25. The client computing device of claim 23, wherein the generic key is unique to a server farm.

26. The client computing device of claim 23, wherein the generic key is unique to a plurality of server farms.

27. The client computing device of claim 23, wherein the characteristics of the client computing device includes at least one of: a client computing device phone number, SID, client computing device BREW version, client computing device hardware ID, client computing device firmware version, carrier ID, RUIM card ID, MDN, MIN, device network address, service subscriber billing account number, client computing device secret key, user ID and a PIN.

28. A system for providing secure communications between a client computing device and a server, the remote client computing device and server coupled to a network, comprising:
   a client computing device including logic configured to:
      send, via the network, characteristics of the client computing device; and
      receive, via the network, a plurality of credentials; and
   a server including logic configured to:
      receive, via the network, the characteristics of the client computing device;
      generate the plurality of credentials, at least one of the plurality of credentials based on both the received characteristics of the client computing device and a unique client key, and at least one of the plurality of credentials based on both the received characteristics of the client computing device and a generic key; and
      send, via the network, the plurality of credentials.

29. A computer readable medium including at least one set of instructions stored thereon that may be utilized by at least one processor to provide secure communications between a client computing device and a server, the remote client computing device and server coupled to a network, the computer readable medium comprising:
   a set of instructions for receiving, via the network, characteristics of the client computing device;
   a set of instructions for generating a plurality of credentials, at least one of the plurality of credentials based on both the received characteristics of the client computing device and a unique client key, and at least one of the plurality of credentials based on both the received characteristics of the client computing device and a generic key; and
   a set of instructions for sending, via the network, the plurality of credentials.

30. The computer readable medium of claim 29, wherein the generic key is unique to at least: a server, a server farm and a plurality of server farms.

31. A computer readable medium including at least one set of instructions stored thereon that may be utilized by at least one processor to provide secure communications between a client computing device and a server, the remote client computing device and server coupled to a network, the computer readable medium comprising:
   a set of instructions for sending, via the network, characteristics of the client computing device; and
   a set of instructions for receiving, via the network, a plurality of credentials, at least one of the plurality of credentials based on both the characteristics of the client computing device and a unique client key, and at least one of the plurality of credentials based on both the characteristics of the client computing device and a generic key.

32. The computer readable medium of claim 31, wherein the generic key is unique to at least one of: a server, server farm and a plurality of server farms.

33. A server for processing secure communications with a client computing device over a network, comprising:
   means for receiving, via the network, characteristics of the client computing device;
   means for generating a plurality of credentials, at least one of the plurality of credentials based on both the received characteristics of the client computing device and a unique client key, and at least one of the plurality of credentials based on both the received characteristics of the client computing device and a generic key; and
   means for sending, via the network, the plurality of credentials.

34. The server of claim 33, wherein the generic key is unique to at least one of: a server, a server farm and a plurality of server farms.

35. A client computing device for processing secure communications with a server over a network, comprising:
   means for sending, via the network, characteristics of the client computing device; and means for receiving, via the network, a plurality of credentials, at least one of the plurality of credentials based on both the characteristics of the client computing device and a unique client key, and at least one of the plurality of credentials based on both the characteristics of the client computing device and a generic key.

36. The client computing device of claim 35, wherein the generic key is unique to at least one of: a server, a server farm and a plurality of server farms.

37. A method for providing secure communications between a client computing device and a server, the remote client computing device and server coupled to a network, comprising:
    receiving, via the network, a signal including a plurality of credentials, at least one of the plurality of credentials based on both the received characteristics of the client computing device and a unique client key, and at least one of the plurality of credentials based on both the received characteristics of the client computing device and a generic key; and
    determining the authenticity of the signal based upon the selective authentication of any of the plurality of credentials.

38. The method of claim 37, wherein the authenticity of the signal is determined using the at least one of the plurality of credentials based on both the received characteristics of the client computing device and the unique client key.

39. The method of claim 37, wherein the generic key is unique to a server.

40. The method of claim 39, wherein the authenticity of the signal is determined using the at least one of the plurality of credentials based on both the received characteristics of the client computing device and the generic key unique to a server.

41. The method of claim 37, wherein the generic key is unique to a server farm.

42. The method of claim 41, wherein the authenticity of the signal is determined using the at least one of the plurality of credentials based on both the received characteristics of the client computing device and the generic key unique to a server farm.

43. The method of claim 37, wherein the generic key is unique to a plurality of server farms.

44. The method of claim 43, wherein the authenticity of the signal is determined using the at least one of the plurality of credentials based on both the received characteristics of the client computing device and the generic key unique to a plurality of server farms.

45. The method of claim 37, wherein the characteristics of the client computing device includes at least one of: a client computing device phone number, SID, client computing device BREW version, client computing device hardware ID, client computing device firmware version, carrier ID, RUIM card ID, MDN, MIN, device network address, service subscriber billing account number, client computing device secret key, user ID and a PIN.

46. A method for providing secure communications between a client computing device and a server, the remote client computing device and server coupled to a network, comprising:
    sending, via the network, a signal including a plurality of credentials, at least one of the plurality of credentials based on both the characteristics of the client computing device and a unique client key, and at least one of the plurality of credentials based on both the characteristics of the client computing device and a generic key.

47. The method of claim 46, wherein the generic key is unique to at least: a server, a server farm and a plurality of server farms.

48. The method of claim 46, wherein the characteristics of the client computing device includes at least one of: a client computing device phone number, SID, client computing device BREW version, client computing device hardware ID, client computing device firmware version, carrier ID, RUIM card ID, MDN, MIN, device network address, service subscriber billing account number, client computing device secret key, user ID and a PIN.

49. The method of claim 46, wherein the plurality of credentials included in the signal was previously received, via the network.

50. A method for providing secure communications between a client computing device and a server, the remote client computing device and server coupled to a network, comprising:
    sending from the client computing device, via the network, a signal including a plurality of credentials, at least one of the plurality of credentials based on both the received characteristics of the client computing device and a unique client key, and at least one of the plurality of credentials based on both the received characteristics of the client computing device and a generic key;
    receiving at the server, via the network, the signal; and
    determining at the server, the authenticity of the signal based upon the selective authentication of any of the plurality of credentials.

51. The method of claim 50, wherein the authenticity of the received signal is determined using the at least one of the plurality of credentials based on both the received characteristics of the client computing device and the unique client key.

52. The method of claim 50, wherein the generic key is unique to a server and the authenticity of the signal is determined using the at least one of the plurality of credentials based on both the received characteristics of the client computing device and the generic key unique to a server.

53. The method of claim 50, wherein the generic key is unique to a server farm and the authenticity of the signal is determined using the at least one of the plurality of credentials based on both the received characteristics of the client computing device and the generic key unique to a server farm.

54. The method of claim 50, wherein the generic key is unique to a plurality of server farms and the authenticity of the signal is determined using the at least one of the plurality of credentials based on both the received characteristics of the client computing device and the generic key unique to a plurality of server farms.

55. The method of claim 50, wherein the characteristics of the client computing device includes at least one of: a client computing device phone number, SID, client computing device BREW version, client computing device hardware ID, client computing device firmware version, carrier ID, RUIM card ID, MDN, MIN, device network address, service subscriber billing account number, client computing device secret key, user ID and a PIN.

56. A server for processing secure communications with a client computing device over a network, comprising:
    logic configured to receive, via the network, a signal including a plurality of credentials, at least one of the plurality of credentials based on both the received characteristics of the client computing device and a unique client key, and at least one of the plurality of credentials based on both the received characteristics of the client computing device and a generic key; and logic configured to determine the authenticity of the signal based upon the selective authentication of any of the plurality of credentials.

57. The server of claim 56, wherein the logic configured to determine the authenticity of the signal is configured to use the at least one of the plurality of credentials based on both the received characteristics of the client computing device and the unique client key.

58. The server of claim 56, wherein the generic key is unique to a server.

59. The server of claim 58, wherein the logic configured to determine the authenticity of the signal is configured to use the at least one of the plurality of credentials based on both the received characteristics of the client computing device and the generic key unique to a server.

60. The server of claim 56, wherein the generic key is unique to a server farm.

61. The server of claim 60, wherein the logic configured to determine the authenticity of the signal is configured to use the at least one of the plurality of credentials based on both the received characteristics of the client computing device and the generic key unique to a server farm.

62. The server of claim 56, wherein the generic key is unique to a plurality of server farms.

63. The server of claim 62, wherein the logic configured to determine the authenticity of the signal is configured to use the at least one of the plurality of credentials based on both the received characteristics of the client computing device and the generic key unique to a plurality of server farms.

64. The server of claim 56, wherein the characteristics of the client computing device includes at least one of: a client computing device phone number, SID, client computing device BREW version, client computing device hardware ID, client computing device firmware version, carrier ID, RUIM card ID, MDN, MIN, device network address, service subscriber billing account number, client computing device secret key, user ID and a PIN.

65. A client computing device for processing secure communications with a server over a network, comprising:
    logic configured to send, via the network, a signal including a plurality of credentials, at least one of the plurality of credentials based on both the characteristics of the client computing device and a unique client key, and at least one of the plurality of credentials based on both the characteristics of the client computing device and a generic key.

66. The client computing device of claim 65, wherein the generic key is unique to at least one of: a server, a server farm and a plurality of server farms.

67. The client computing device of claim 65, wherein the characteristics of the client computing device includes at least one of: a client computing device phone number, SID, client computing device BREW version, client computing device hardware ID, client computing device firmware version, carrier ID, RUIM card ID, MDN, MIN, device network address, service subscriber billing account number, client computing device secret key, user ID and a PIN.

68. The client computing device of claim 65, wherein the plurality of credentials included in the signal was previously received, via the network.

69. A system for providing secure communications between a client computing device and a server, the remote client computing device and server coupled to a network, comprising:
    a client computing device including logic configured to:
        send, via the network, a signal including a plurality of credentials, at least one of the plurality of credentials based on both the received characteristics of the client computing device and a unique client key, and at least one of the plurality of credentials based on both the received characteristics of the client computing device and a generic key; and
    a server including logic configured to:
        receive, via the network, the signal; and
        determine, the authenticity of the signal based upon the selective authentication of any of the plurality of credentials.

70. A computer readable medium including at least one set of instructions stored thereon that may be utilized by at least one processor to provide secure communications between a client computing device and a server, the remote client computing device and server coupled to a network, the computer readable medium comprising:
    a set of instructions for receiving, via the network, a signal including a plurality of credentials, at least one of the plurality of credentials based on both the received characteristics of the client computing device and a unique client key, and at least one of the plurality of credentials based on both the received characteristics of the client computing device and a generic key; and
    a set of instructions for determining the authenticity of the signal based upon the selective authentication of any of the plurality of credentials.

71. The computer readable medium of claim 70, wherein the authenticity of the signal is determined using the at least one of the plurality of credentials based on both the received characteristics of the client computing device and the unique client key.

72. The computer readable medium of claim 70, wherein the generic key is unique to a server farm.

73. A computer readable medium including at least one set of instructions stored thereon that may be utilized by at least one processor to provide secure communications between a client computing device and a server, the remote client computing device and server coupled to a network, the computer readable medium comprising:
    a set of instructions for sending, via the network, a signal including a plurality of credentials, at least one of the plurality of credentials based on both the characteristics of the client computing device and a unique client key, and at least one of the plurality of credentials based on both the characteristics of the client computing device and a generic key.

74. The computer readable medium of claim 73, wherein the generic key is unique to at least: a server, a server farm and a plurality of server farms.

75. A server for processing secure communications with a client computing device over a network, comprising:
    means for receiving, via the network, a signal including a plurality of credentials, at least one of the plurality of credentials based on both the received characteristics of the client computing device and a unique client key, and at least one of the plurality of credentials based on both the received characteristics of the client computing device and a generic key; and
    means for determining the authenticity of the signal based upon the selective authentication of any of the plurality of credentials.

76. The server of claim 75, wherein the logic configured to determine the authenticity of the signal is configured to use the at least one of the plurality of credentials based on both the received characteristics of the client computing device and the unique client key.

77. The server of claim 75, wherein the generic key is unique to a server farm.

78. A client computing device for processing secure communications with a server over a network, comprising:

means for sending, via the network, a signal including a plurality of credentials, at least one of the plurality of credentials based on both the characteristics of the client computing device and a unique client key, and at least one of the plurality of credentials based on both the characteristics of the client computing device and a generic key.

79. The client computing device of claim 78, wherein the generic key is unique to at least: a server, a server farm and a plurality of server farms.

80. A method for providing secure communications between a client computing device and a server, the client computing device and server coupled to a network, comprising:

receiving, via the network, a signal including the characteristics of the client computing device;
generating a plurality of credentials, at least one of the plurality of credentials based on both the received characteristics of the client computing device and a unique client key, and at least one of the plurality of credentials based on both the received characteristics of the client computing device and a generic key;
sending, via the network, a signal including the plurality of credentials;
receiving, via the network, a signal including the plurality of credentials; and
determining the authenticity of the received signal based upon the selective authentication of any of the received plurality of credentials.

81. A method for providing secure communications between a client computing device and a server, the remote client computing device and server coupled to a network, comprising:

sending, via the network, a signal including characteristics of the client computing device;
receiving, via the network, a signal including a plurality of credentials, at least one of the plurality of credentials based on both the characteristics of the client computing device and a unique client key, and at least one of the plurality of credentials based on both the characteristics of the client computing device and a generic key; and
sending, via the network, a signal including the received plurality of credentials.

82. A server for processing secure communications with a client computing device over a network, comprising:

logic configured to receive, via the network, a signal including characteristics of the client computing device;
logic configured to generate a plurality of credentials, at least one of the plurality of credentials based on both the received characteristics of the client computing device and a unique client key, and at least one of the plurality of credentials based on both the received characteristics of the client computing device and a generic key;
logic configured to send, via the network, a signal including the plurality of credentials;
logic configured to receive, via the network, a signal including the plurality of credentials; and
logic configured to determine the authenticity of the received signal including a plurality of credentials based upon the selective authentication of any of the received plurality of credentials.

83. A client computing device for processing secure communications with a server over a network, comprising:

logic configured to send, via the network, a signal including characteristics of the client computing device;
logic configured to receive, via the network, a signal including a plurality of credentials, at least one of the plurality of credentials based on both the characteristics of the client computing device and a unique client key, and at least one of the plurality of credentials based on both the characteristics of the client computing device and a generic key; and
logic configured to send, via the network, a signal including the received plurality of credentials.

84. A computer readable medium including at least one set of instructions stored thereon that may be utilized by at least one processor to provide secure communications between a client computing device and a server, the remote client computing device and server coupled to a network, the computer readable medium comprising:

a set of instructions for receiving, via the network, a signal including characteristics of the client computing device;
a set of instructions for generating a plurality of credentials, at least one of the plurality of credentials based on both the received characteristics of the client computing device and a unique client key, and at least one of the plurality of credentials based on both the received characteristics of the client computing device and a generic key;
a set of instructions for sending, via the network, a signal including the plurality of credentials;
a set of instructions for receiving, via the network, a signal including the sent plurality of credentials; and
a set of instructions for determining the authenticity of the received signal including the received plurality of credentials based upon the selective authentication of any of the received plurality of credentials.

85. A computer readable medium including at least one set of instructions stored thereon that may be utilized by at least one processor to provide secure communications between a client computing device and a server, the remote client computing device and server coupled to a network, the computer readable medium comprising:

a set of instructions for sending, via the network, a signal including characteristics of the client computing device;
a set of instructions for receiving, via the network, a signal including a plurality of credentials, at least one of the plurality of credentials based on both the characteristics of the client computing device and a unique client key, and at least one of the plurality of credentials based on both the characteristics of the client computing device and a generic key; and
a set of instructions for sending, via the network, a signal including the received plurality of credentials.

86. A server for processing secure communications with a client computing device over a network, comprising:

means for receiving, via the network, a signal including characteristics of the client computing device;
means for generating a signal including a plurality of credentials, at least one of the plurality of credentials based on both the received characteristics of the client computing device and a unique client key, and at least one of the plurality of credentials based on both the received characteristics of the client computing device and a generic key;
means for sending, via the network, a signal including the plurality of credentials;
means for receiving, via the network, a signal including the sent plurality of credentials; and means for determining the authenticity of the received signal including the received plurality of credentials based upon the selective authentication of any of the received plurality of credentials.

87. A client computing device for processing secure communications with a server over a network, comprising:

means for sending, via the network, a signal including characteristics of the client computing device;

means for receiving, via the network, a signal including a plurality of credentials, at least one of the plurality of credentials based on both the characteristics of the client computing device and a unique client key, and at least one of the plurality of credentials based on both the characteristics of the client computing device and a generic key; and means for sending, via the network, a signal including the received plurality of credentials.

88. The method of claim 1, wherein the sending step is performed while the client computing device operates in a secure mode, the secure mode including the use of a secure file system.

* * * * *